(12) United States Patent
Sivik et al.

(10) Patent No.: US 11,193,097 B2
(45) Date of Patent: Dec. 7, 2021

(54) WATER-SOLUBLE UNIT DOSE ARTICLES COMPRISING ENZYME

(71) Applicant: The Procter & Gamble Company, Cincinnati, OH (US)

(72) Inventors: Mark Robert Sivik, Mason, OH (US); Theresa Anne Buehler, Cincinnati, OH (US); Frank William Denome, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/253,275

(22) Filed: Jan. 22, 2019

(65) Prior Publication Data

US 2019/0233784 A1    Aug. 1, 2019

Related U.S. Application Data

(60) Provisional application No. 62/622,460, filed on Jan. 26, 2018.

(51) Int. Cl.
| | |
|---|---|
| *C11D 17/06* | (2006.01) |
| *C11D 17/04* | (2006.01) |
| *C11D 3/386* | (2006.01) |
| *D06M 16/00* | (2006.01) |
| *C11D 1/14* | (2006.01) |
| *C11D 1/24* | (2006.01) |
| *C11D 11/00* | (2006.01) |

(52) U.S. Cl.
CPC ............ *C11D 17/044* (2013.01); *C11D 3/386* (2013.01); *C11D 3/38609* (2013.01); *C11D 3/38627* (2013.01); *C11D 3/38636* (2013.01); *C11D 17/042* (2013.01); *C11D 17/06* (2013.01); *D06M 16/003* (2013.01); *B32B 2260/023* (2013.01); *B32B 2307/7166* (2013.01); *B32B 2432/00* (2013.01); *C11D 1/146* (2013.01); *C11D 1/24* (2013.01); *C11D 11/0017* (2013.01)

(58) Field of Classification Search
None
See application file for complete search history.

(56) References Cited

U.S. PATENT DOCUMENTS

| 3,293,718 A | 12/1966 | Sheets |
| 3,859,125 A | 1/1975 | Miller et al. |

(Continued)

FOREIGN PATENT DOCUMENTS

| AU | 2004/202461 B2 | 11/2007 |
| CA | 2695068 A1 | 9/2010 |

(Continued)

OTHER PUBLICATIONS

PCT Search Report for appl. No. PCT/US2018/015354, dated May 14, 2018, 13 pages.

(Continued)

*Primary Examiner* — Lorna M Douyon
(74) *Attorney, Agent, or Firm* — Carrie Schwartz

(57) ABSTRACT

Described herein is a household care composition, which delivers active agents onto fabric, in the form of a water-soluble unit dose article comprising a water-soluble fibrous structure and a concentrated enzyme composition, as well as methods for making the article and methods for treating fabrics using the article.

19 Claims, 6 Drawing Sheets

(56) References Cited

U.S. PATENT DOCUMENTS

| | | | |
|---|---|---|---|
| 4,101,457 A * | 7/1978 | Place | C11D 3/386 |
| | | | 510/221 |
| 4,180,558 A | 12/1979 | Goldberg et al. | |
| 4,286,016 A | 8/1981 | Dimond et al. | |
| 4,287,219 A | 9/1981 | Fabre | |
| 4,315,965 A | 2/1982 | Mason et al. | |
| 4,342,813 A | 8/1982 | Erickson | |
| 4,349,531 A | 9/1982 | Mlodozeniec et al. | |
| 4,377,615 A | 3/1983 | Suzuki et al. | |
| 4,397,391 A | 8/1983 | Cornelissens | |
| 4,415,617 A | 11/1983 | D'Elia | |
| 4,639,390 A | 1/1987 | Shoji | |
| 4,892,758 A | 1/1990 | Serbiak et al. | |
| 4,923,660 A | 5/1990 | Willenberg et al. | |
| 5,041,252 A | 8/1991 | Fujii et al. | |
| 5,110,678 A | 5/1992 | Narukawa et al. | |
| 5,120,888 A | 6/1992 | Nohr et al. | |
| 5,135,804 A | 8/1992 | Harpell et al. | |
| 5,158,810 A | 10/1992 | Oishi et al. | |
| 5,208,104 A | 5/1993 | Ueda et al. | |
| 5,230,853 A | 7/1993 | Colegrove et al. | |
| 5,246,603 A | 9/1993 | Tsaur | |
| 5,342,335 A | 8/1994 | Rhim | |
| 5,362,532 A | 11/1994 | Famili et al. | |
| 5,364,627 A | 11/1994 | Song | |
| 5,387,147 A | 2/1995 | Ohshima et al. | |
| 5,429,874 A | 7/1995 | Vanputte | |
| 5,455,114 A | 10/1995 | Ohmory et al. | |
| 5,470,424 A | 11/1995 | Isaac et al. | |
| 5,470,653 A | 11/1995 | Honeycutt et al. | |
| 5,486,418 A | 1/1996 | Ohmory et al. | |
| 5,518,730 A | 5/1996 | Fuisz | |
| 5,520,924 A | 5/1996 | Chapman et al. | |
| 5,538,735 A | 7/1996 | Ahn | |
| 5,585,059 A | 12/1996 | Kobayashi et al. | |
| 5,651,987 A | 7/1997 | Fuisz | |
| 5,691,015 A | 11/1997 | Tsukamoto et al. | |
| 5,705,183 A | 1/1998 | Phillips et al. | |
| 5,716,692 A | 2/1998 | Warner et al. | |
| 5,717,026 A | 2/1998 | Ikimine et al. | |
| 5,735,812 A | 4/1998 | Hardy | |
| 5,780,418 A | 7/1998 | Niinaka et al. | |
| 5,827,586 A | 10/1998 | Yamashita et al. | |
| 5,840,423 A | 11/1998 | Sano et al. | |
| 5,863,887 A | 1/1999 | Gillette | |
| 5,879,493 A | 3/1999 | Johnson et al. | |
| 5,911,224 A | 6/1999 | Berger | |
| 5,914,124 A | 6/1999 | Mahoney et al. | |
| 5,942,179 A | 8/1999 | Tallentire et al. | |
| 6,008,181 A | 12/1999 | Cripe | |
| 6,037,319 A | 3/2000 | Dickler et al. | |
| 6,066,396 A | 5/2000 | Inada et al. | |
| 6,080,346 A | 6/2000 | Jack | |
| 6,130,193 A | 10/2000 | Gillette | |
| 6,175,054 B1 | 1/2001 | Jacques | |
| 6,197,238 B1 | 3/2001 | Wang et al. | |
| 6,207,274 B1 | 3/2001 | Ferenc et al. | |
| 6,274,162 B1 | 8/2001 | Steffenino et al. | |
| 6,319,510 B1 | 11/2001 | Yates | |
| 6,406,797 B1 | 6/2002 | Vanputte | |
| 6,420,625 B1 | 7/2002 | Jones et al. | |
| 6,448,462 B2 | 9/2002 | Groitzsch et al. | |
| 6,465,407 B2 | 10/2002 | Hayashi et al. | |
| 6,552,123 B1 | 4/2003 | Katayama et al. | |
| 6,576,575 B1 | 6/2003 | Griesbach, III et al. | |
| 6,608,121 B2 | 8/2003 | Isozaki et al. | |
| 6,657,004 B2 | 12/2003 | Mizutani | |
| 6,699,826 B1 | 3/2004 | Saijo et al. | |
| 6,730,648 B2 | 5/2004 | Gorlin et al. | |
| 6,783,852 B2 | 8/2004 | Inada et al. | |
| 6,787,512 B1 | 9/2004 | Verrall et al. | |
| 6,808,598 B1 | 10/2004 | Takeuchi et al. | |
| 6,818,606 B1 | 11/2004 | Hanada et al. | |
| 6,898,921 B2 | 5/2005 | Duffield | |
| 6,949,498 B2 | 9/2005 | Murphy et al. | |
| 6,956,070 B2 | 10/2005 | Fujiwara et al. | |
| 6,977,116 B2 | 12/2005 | Cabell et al. | |
| 7,026,049 B2 | 4/2006 | Endo et al. | |
| 7,041,628 B2 | 5/2006 | Sunder | |
| 7,067,575 B2 | 6/2006 | Kitamura et al. | |
| 7,083,047 B2 | 8/2006 | Bone et al. | |
| 7,094,744 B1 | 8/2006 | Kobayashi et al. | |
| 7,115,551 B2 | 10/2006 | Hasenorhrl et al. | |
| 7,169,740 B2 | 1/2007 | Sommerville-Roberts et al. | |
| 7,196,026 B2 | 3/2007 | Di Luccio et al. | |
| RE39,557 E | 4/2007 | Moe | |
| 7,226,899 B2 | 6/2007 | Cole et al. | |
| 7,285,520 B2 | 10/2007 | Krzysik et al. | |
| 7,387,787 B2 | 6/2008 | Fox | |
| 7,407,669 B2 | 8/2008 | Leung et al. | |
| 7,429,273 B2 | 9/2008 | DeDominicis et al. | |
| 7,446,084 B2 | 11/2008 | Barthel et al. | |
| 7,491,407 B2 | 2/2009 | Pourdeyhimi et al. | |
| 7,507,698 B2 | 3/2009 | Franzolin et al. | |
| 7,547,737 B2 | 6/2009 | Kochvar et al. | |
| 7,563,757 B2 | 7/2009 | Kouvroukoglou et al. | |
| 7,708,840 B2 | 5/2010 | Wiedemann et al. | |
| 7,727,946 B2 | 6/2010 | Catalfamo et al. | |
| 7,824,588 B2 | 11/2010 | Yang et al. | |
| 7,856,989 B2 | 12/2010 | Karles et al. | |
| 7,967,801 B2 | 6/2011 | Hammons et al. | |
| 8,338,358 B2 | 12/2012 | Bernhardt | |
| 8,349,232 B2 | 1/2013 | Pourdeyhimi et al. | |
| 8,785,361 B2 | 7/2014 | Sivik | |
| 8,980,816 B2 * | 3/2015 | Dreher | C11D 17/0039 |
| | | | 510/296 |
| 9,074,305 B2 | 7/2015 | Glenn, Jr. | |
| 9,163,205 B2 | 10/2015 | Sivik | |
| 9,175,250 B2 | 11/2015 | Sivik | |
| 9,267,095 B2 | 2/2016 | Delaney | |
| 9,421,153 B2 | 8/2016 | Sivik | |
| 9,480,628 B2 | 11/2016 | Sivik | |
| 9,493,726 B2 | 11/2016 | Vinson | |
| 9,796,948 B2 | 10/2017 | Shearouse | |
| 10,045,915 B2 | 8/2018 | Glenn, Jr. | |
| 2001/0037851 A1 | 11/2001 | Mortellite et al. | |
| 2002/0013251 A1 | 1/2002 | Hayashi | |
| 2002/0018906 A1 | 2/2002 | Clark | |
| 2002/0098994 A1 | 7/2002 | Zafar | |
| 2002/0161088 A1 | 10/2002 | Kochvar et al. | |
| 2002/0173213 A1 | 11/2002 | Chu et al. | |
| 2003/0017208 A1 | 1/2003 | Ignatious et al. | |
| 2003/0045446 A1 | 3/2003 | Dihora et al. | |
| 2003/0166495 A1 | 9/2003 | Wang et al. | |
| 2003/0185872 A1 | 10/2003 | Kochinke | |
| 2003/0216098 A1 | 11/2003 | Carlyle | |
| 2003/0224959 A1 | 12/2003 | Smith | |
| 2004/0129032 A1 | 7/2004 | Severns | |
| 2004/0167256 A1 | 8/2004 | Verrall et al. | |
| 2004/0170836 A1 | 9/2004 | Bond et al. | |
| 2004/0180597 A1 | 9/2004 | Kamada et al. | |
| 2004/0204543 A1 | 10/2004 | Yang | |
| 2005/0003048 A1 | 1/2005 | Pearce et al. | |
| 2005/0003980 A1 | 1/2005 | Baker | |
| 2005/0003991 A1 | 1/2005 | MacQuarrie | |
| 2005/0008776 A1 | 1/2005 | Chhabra et al. | |
| 2005/0010010 A1 | 1/2005 | Kitamura et al. | |
| 2005/0136112 A1 | 6/2005 | Gonzales et al. | |
| 2005/0136780 A1 | 6/2005 | Clark et al. | |
| 2005/0186256 A1 | 8/2005 | Dihel et al. | |
| 2005/0209574 A1 | 9/2005 | Boehringer et al. | |
| 2005/0266542 A1 | 12/2005 | Baur et al. | |
| 2005/0281757 A1 | 12/2005 | Ibrahim et al. | |
| 2006/0013869 A1 | 1/2006 | Ignatious et al. | |
| 2006/0035042 A1 | 2/2006 | Morken | |
| 2006/0083784 A1 | 4/2006 | Ignatious et al. | |
| 2006/0111261 A1 | 5/2006 | Sadlowski | |
| 2006/0127458 A1 | 6/2006 | Kiser et al. | |
| 2006/0134412 A1 | 6/2006 | Mackey et al. | |
| 2006/0160453 A1 | 7/2006 | Suh | |
| 2006/0189772 A1 | 8/2006 | Scheibel et al. | |
| 2006/0205628 A1 | 9/2006 | Deinhammer | |
| 2006/0254013 A1 | 11/2006 | Konishi et al. | |
| 2006/0254014 A1 | 11/2006 | Konishi et al. | |

(56) References Cited

U.S. PATENT DOCUMENTS

| | | |
|---|---|---|
| 2006/0258251 A1 | 11/2006 | Konishi et al. |
| 2006/0264130 A1 | 11/2006 | Karles et al. |
| 2007/0054579 A1 | 3/2007 | Baker et al. |
| 2007/0110792 A9 | 5/2007 | Simon |
| 2007/0128256 A1 | 6/2007 | Aubrun-Sonneville |
| 2007/0134304 A1 | 6/2007 | Aubrun-Sonneville et al. |
| 2007/0134481 A1 | 6/2007 | Aubrun-Sonneville |
| 2007/0253926 A1 | 11/2007 | Tadrowski et al. |
| 2007/0259170 A1 | 11/2007 | Brown et al. |
| 2007/0259996 A1 | 11/2007 | Vicari et al. |
| 2007/0281874 A1 | 12/2007 | Frankenbach |
| 2007/0298064 A1 | 12/2007 | Koslow |
| 2008/0035174 A1 | 2/2008 | Aubrun-Sonneville et al. |
| 2008/0108748 A1 | 5/2008 | Buckley et al. |
| 2008/0118727 A1 | 5/2008 | Andersen |
| 2008/0146481 A1 | 6/2008 | Brown et al. |
| 2008/0149119 A1 | 6/2008 | Marquez et al. |
| 2008/0220054 A1 | 9/2008 | Shastri et al. |
| 2008/0226919 A1 | 9/2008 | Hosoda et al. |
| 2008/0242572 A1 | 10/2008 | Icht et al. |
| 2008/0269095 A1 | 10/2008 | Aubrun-Sonneville |
| 2009/0004254 A1 | 1/2009 | Maibach |
| 2009/0041820 A1 | 2/2009 | Wu et al. |
| 2009/0061496 A1 | 3/2009 | Kuhn et al. |
| 2009/0061719 A1 | 3/2009 | Shibutani et al. |
| 2009/0155326 A1 | 6/2009 | Mack et al. |
| 2009/0181587 A1 | 7/2009 | Kang et al. |
| 2009/0249558 A1 | 10/2009 | Fileccia et al. |
| 2009/0285718 A1 | 11/2009 | Privitera et al. |
| 2009/0291282 A1 | 11/2009 | Kitamura et al. |
| 2010/0018641 A1 | 1/2010 | Branham et al. |
| 2010/0021517 A1 | 1/2010 | Ahlers et al. |
| 2010/0105821 A1 | 4/2010 | Verrall et al. |
| 2010/0166854 A1 | 7/2010 | Michniak-Kohn et al. |
| 2010/0196440 A1 | 8/2010 | Stark et al. |
| 2010/0266668 A1 | 10/2010 | Coffee et al. |
| 2010/0279905 A1 | 11/2010 | Glenn, Jr. et al. |
| 2010/0285101 A1 | 11/2010 | Moore et al. |
| 2011/0065163 A1* | 3/2011 | Becker ............... C11D 17/0039 435/187 |
| 2011/0136719 A1 | 6/2011 | Jalbert et al. |
| 2011/0159267 A1 | 6/2011 | Lee et al. |
| 2011/0223381 A1 | 9/2011 | Mackey et al. |
| 2011/0230112 A1 | 9/2011 | Rosé et al. |
| 2011/0301070 A1 | 12/2011 | Ochomogo et al. |
| 2012/0021026 A1 | 1/2012 | Chhabra et al. |
| 2012/0027838 A1 | 2/2012 | Gordon et al. |
| 2012/0048769 A1 | 3/2012 | Sivik et al. |
| 2012/0052036 A1 | 3/2012 | Glen, Jr. et al. |
| 2012/0053103 A1 | 3/2012 | Sivik et al. |
| 2012/0053108 A1 | 3/2012 | Glen, Jr. et al. |
| 2012/0058166 A1 | 3/2012 | Glen, Jr. et al. |
| 2012/0082037 A1 | 3/2012 | Sivik et al. |
| 2012/0154300 A1 | 6/2012 | Ma |
| 2012/0172831 A1 | 7/2012 | Darcy et al. |
| 2012/0215148 A1 | 8/2012 | Ewert et al. |
| 2012/0237576 A1 | 9/2012 | Gordon et al. |
| 2013/0167305 A1 | 7/2013 | Weisman et al. |
| 2013/0171421 A1 | 7/2013 | Weisman et al. |
| 2013/0172226 A1 | 7/2013 | Dreher et al. |
| 2014/0287973 A1 | 9/2014 | Sivik et al. |
| 2014/0366294 A1 | 12/2014 | Roe |
| 2015/0048001 A1 | 2/2015 | Bailey |
| 2015/0104856 A1 | 4/2015 | Astrid |
| 2015/0313807 A1 | 11/2015 | Lynch |
| 2015/0368001 A1 | 12/2015 | Gruenbacher |
| 2016/0010041 A1 | 1/2016 | Sivik |
| 2016/0024447 A1 | 1/2016 | Simonsen et al. |
| 2016/0040105 A1 | 2/2016 | Depoot et al. |
| 2016/0101204 A1 | 4/2016 | Lynch |
| 2016/0137956 A1 | 5/2016 | Hayward et al. |
| 2016/0152927 A1* | 6/2016 | van Deurzen ..... C11D 3/38663 510/392 |
| 2016/0186095 A1 | 6/2016 | Vockenroth |
| 2016/0200501 A1 | 7/2016 | Lee |
| 2016/0250109 A1* | 9/2016 | Dreher ..................... A61Q 5/00 424/401 |
| 2016/0271021 A1 | 9/2016 | Glenn, Jr. |
| 2016/0340624 A1 | 11/2016 | Sivik |
| 2016/0374906 A1 | 12/2016 | Sivik |
| 2017/0009191 A1 | 1/2017 | Maes |
| 2017/0067002 A1 | 3/2017 | Cumming |
| 2017/0164612 A1 | 6/2017 | Ripberger |
| 2017/0320105 A1 | 11/2017 | Roozrokh |
| 2018/0216050 A1* | 8/2018 | Denome ................ C11D 17/06 |
| 2018/0216052 A1* | 8/2018 | Denome .............. C11D 3/3723 |
| 2018/0216053 A1* | 8/2018 | Denome .............. C11D 17/042 |
| 2018/0216286 A1* | 8/2018 | Glassmeyer ......... D04H 1/4374 |
| 2018/0216287 A1* | 8/2018 | Weisman ............... A61K 8/027 |
| 2018/0223229 A1 | 8/2018 | Tan |
| 2018/0338890 A1 | 11/2018 | Glenn, Jr. |
| 2019/0233782 A1 | 8/2019 | Sivik |
| 2019/0233783 A1 | 8/2019 | Sivik |
| 2019/0233785 A1 | 8/2019 | Sivik |
| 2021/0238513 A1 | 8/2021 | Sivik et al. |

FOREIGN PATENT DOCUMENTS

| | | |
|---|---|---|
| CN | 1474657 A | 2/2004 |
| CN | 108822976 A | 11/2018 |
| DE | 10 2007 011606 A1 | 9/2008 |
| EP | 1 275 368 A1 | 1/2003 |
| EP | 1 306 425 A2 | 5/2003 |
| EP | 1 409 628 B1 | 2/2006 |
| EP | 1 512 701 B1 | 6/2006 |
| EP | 1 887 036 A2 | 2/2008 |
| EP | 1 888 036 | 2/2008 |
| EP | 1 436 376 B1 | 4/2010 |
| EP | 2 226 379 A1 | 9/2010 |
| EP | 1 948 771 B1 | 12/2010 |
| EP | 2 319 965 A1 | 5/2011 |
| EP | 2 363 432 A1 | 9/2011 |
| EP | 2 363 517 A1 | 9/2011 |
| EP | 2 395 142 A1 | 12/2011 |
| GB | 2107579 A | 5/1993 |
| GB | 2375542 | 11/2002 |
| GB | 2449418 | 11/2008 |
| HU | 221299 B1 | 9/2002 |
| JP | 62-156348 | 7/1987 |
| JP | 3040879 A | 2/1991 |
| JP | 3101618 A | 4/1991 |
| JP | 09279457 | 10/1997 |
| JP | 10008364 | 1/1998 |
| JP | H108098 A | 1/1998 |
| JP | 10158700 A | 6/1998 |
| JP | H1121594 A | 1/1999 |
| JP | H11124600 A | 5/1999 |
| JP | 2000169896 A | 6/2000 |
| JP | 2001294899 A | 10/2001 |
| JP | 2009079329 | 4/2009 |
| WO | WO 1992/006603 A1 | 4/1992 |
| WO | WO 1994/002377 A1 | 2/1994 |
| WO | WO 94/04656 A2 | 3/1994 |
| WO | WO 95/23888 A1 | 9/1995 |
| WO | WO 99/57155 | 11/1999 |
| WO | WO 2000/013680 A2 | 3/2000 |
| WO | WO0027958 A1 | 5/2000 |
| WO | WO 01/25322 A1 | 4/2001 |
| WO | WO 2001/54667 A1 | 8/2001 |
| WO | WO 03/060007 A1 | 7/2003 |
| WO | WO 2004/009335 A1 | 1/2004 |
| WO | WO 2004/081162 A1 | 9/2004 |
| WO | WO 2005/068604 A1 | 7/2005 |
| WO | WO 2006/106514 A2 | 10/2006 |
| WO | WO 2007/089259 A1 | 8/2007 |
| WO | WO 2007/093558 A3 | 1/2008 |
| WO | WO 2009/022761 A1 | 2/2009 |
| WO | WO 2007/014221 A3 | 4/2009 |
| WO | WO2009047124 | 4/2009 |
| WO | WO 2009/103576 A1 | 8/2009 |
| WO | WO 2009/121900 A1 | 10/2009 |
| WO | WO 2010/015709 A2 | 2/2010 |
| WO | WO 2011/153023 A1 | 12/2011 |

(56) References Cited

FOREIGN PATENT DOCUMENTS

| WO | WO2012003367 A3 | 3/2012 |
|---|---|---|
| WO | 2016172088 A1 | 10/2016 |
| WO | WO2017096354 A1 | 6/2017 |

OTHER PUBLICATIONS

PCT Search Report for appl. No. PCT/CN2017/087707, dated Feb. 24, 2018, 12 pages.
PCT Search Report for appl. No. PCT/US2017/046391, dated Nov. 8, 2017, 17 pages.
PCT Search Report for appl. No. PCT/US2018/015357, dated Apr. 11, 2018, 14 pages.
PCT Search Report for appl. No. PCT/US2018/015358, dated Apr. 16, 2018, 15 pages.
PCT Search Report for app. No. PCT/US2019/014452, dated Apr. 8, 2019, 14 pages.
PCT Search Report for appl. No. PCT/U52019/014453, dated Apr. 8, 2019, 15 pages.
PCT Search Report for appl. No. PCT/U52019/014454, dated Apr. 5, 2019, 15 pages.
PCT Search Report for appl. No. PCT/US2019/014455, dated Apr. 5, 2019, 15 pages.
PCT Search Report for appl. No. PCT/US2019/014443, dated Apr. 17, 2019, 15 pages.
PCT Search Report for appl. No. PCT/US2019/014444, dated Apr. 16, 2019, 15 pages.
PCT Search report for appl. No. PCT/U52019/014451, dated Apr. 24, 2019, 12 pages.
PCT Search Report for appl. No. PCT/US2019/019547, dated May 22, 2019, 12 pages.
PCT Search Report for appl. No. PCT/US2019/049727, dated Jan. 2, 2020, 12 pages.
PCT Search report for appl. No. PCT/US2019/040240, dated Dec. 9, 2019, 15 pages.
PCT Search Report for appl. No. PCT/US19/40242, dated Oct. 22, 2019, 14 pages.
PCT Search Report for appl. No. PCT/US2019/052321, 12 pages, dated Dec. 12, 2019.
EP Search Report for appl. No. 19163586.1-1105, dated Sep. 30, 2019, 8 pages.
Search Report for appl. No. 19163588.7-1105, dated Sep. 30, 2019, 7 pages.
PCT Search Report for appl. No. PCT/CN2017/072926, dated Feb. 6, 2017, 5 pages.
PCT Search Report for appl. No. PCT/CN2017/072927, dated Feb. 6, 2017, 6 pages.
PCT Search Report for appl. No. PCT/CN2017/072935, dated Jun. 9, 2017, 4 pages.
PCT appl. No. PCT/CN2018/074281, dated Aug. 29, 2019, 7 pages.
PCT Search Report for appl. No. PCT/ CN2018/ 074282, dated Oct. 22, 2018, 5 pages.
All Office Actions, U.S. Appl. No. 16/253,265, (see at least office action dated Mar. 11, 2021).
All Office Actions, U.S. Appl. No. 16/253,278, (see office actions dated Jun. 26, 2020 and Dec. 31, 2020).
All Office Actions; U.S. Appl. No. 16/253,259, (see office actions dated Jun. 25, 2020 and Dec. 30, 2020).
Makadia, et al., In Journal of Polymers vol. 3, Issue 3, 2011, pp. 1377-1397.
Smith, et al., In Journal of Nanotechnologies for the Life Sciences, vol. 9, 2006, pp. 188-215.
Wang, et al., In Journal of Pharmaceutical Sciences, vol. 99, Issue 12, Dec. 2010, pp. 4805-4811.
All Office Actions, U.S. Appl. No. 17/218,674.

\* cited by examiner

WATER-SOLUBLE UNIT DOSE ARTICLES COMPRISING ENZYME

FIELD OF THE INVENTION

Described herein is a household care composition, which delivers active agents onto fabric, in the form of a water-soluble unit dose article comprising a water-soluble fibrous structure and a concentrated enzyme composition, as well as methods for making the article and methods for treating fabrics using the article.

BACKGROUND OF THE INVENTION

Water-soluble unit dose articles are desired by consumers as they provide a convenient, efficient, and clean way of dosing a fabric or hard surface treatment composition. Water-soluble unit dose articles provide a measured dosage of a treatment composition, thereby avoiding over or under dosing. Fibrous water-soluble unit dose articles are of increasing interest to consumers. The technology related to such articles continues to advance in terms of providing the desired active agents with the articles enabling the consumers to do the job that they wish to accomplish.

Consumers desire fibrous water-soluble unit dose articles that perform as well or better than conventional forms of fabric treatment compositions, such as liquids, powders, and unit dose articles constructed of water-soluble films. Formulators of conventional fabric detergents know that incorporating one or more enzymes in a detergent may improve the cleaning performance of the detergent. For example, formulators may incorporate a combination of a protease, amylase, and lipase to treat a broader variety of stains. In the context of fibrous water-soluble unit dose articles, however, formulators have discovered challenges in formulating with enzymes.

In the manufacturing of fibrous water-soluble unit dose articles, it is difficult to use solid enzymes, such as enzyme prills, due to concerns about hygiene in the manufacturing plant. One way formulators have tried to address these concerns is by using liquid enzyme compositions. However, there may a limit as to how much liquid enzyme composition can be added to a water-soluble, solid substrate, e.g., fibrous ply in a fibrous water-soluble unit dose article, without causing premature dissolution of the substrate.

In view of the above, there is a continuing unaddressed need for a fibrous water-soluble unit dose article that includes enzymes, to provide improved cleaning performance on a variety of stains.

SUMMARY OF THE INVENTION

The present disclosure relates to a water-soluble unit dose article comprising a water-soluble fibrous first ply superposed to a water-soluble fibrous second ply, wherein a concentrated enzyme composition is positioned between the superposed plies, where the water-soluble unit dose article comprises from about 0.1% to about 5% by weight of the concentrated enzyme composition, wherein the concentrated enzyme composition comprises less than 20%.

The present disclosure also relates to a water-soluble unit dose article comprising a water-soluble fibrous first ply superposed to a water-soluble fibrous second ply, wherein an enzyme composition is positioned between the superposed plies, wherein the concentrated enzyme composition has a viscosity of from about 4 Pa·s to about 200 Pa·s when measured at $1 \, s^{-1}$ at 20° C. as determined according to the Shear Viscosity Test Method described herein.

The present disclosure also relates a process for manufacturing a water-soluble unit dose article comprising the steps of: providing a water soluble fibrous first ply; providing a water soluble fibrous second ply, preferably formed on a surface other than said first ply, wherein said second ply is separate from said first ply; providing a concentrated enzyme composition as described herein; placing said enzyme composition on one or both of said first ply and said second ply; superposing said first ply and said second ply so that said enzyme composition is between said first ply and said second ply; and joining a first portion of said first ply to a second portion of said second ply to form said water soluble unit dose article.

The present disclosure also relates to a method of laundering using an article according to the present invention, comprising the steps of, placing at least one article according to the present invention into the washing machine along with the laundry to be washed, and carrying out a washing or cleaning operation.

DETAILED DESCRIPTION OF THE INVENTION

Definitions

Figure 1:
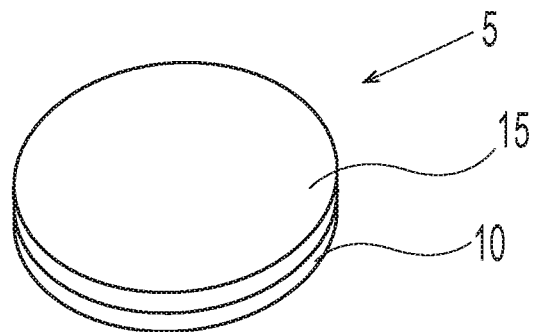
FIG. 1 is a product.

Features and benefits of the present invention will become apparent from the following description, which includes examples intended to give a broad representation of the invention. Various modifications will be apparent to those skilled in the art from this description and from practice of the invention. The scope is not intended to be limited to the particular forms disclosed and the invention covers all modifications, equivalents, and alternatives falling within the spirit and scope of the invention as defined by the claims.

As used herein, the terms "product" and "article" are used interchangeably.

As used herein, the articles including "the," "a" and "an" when used in a claim or in the specification, are understood to mean one or more of what is claimed or described.

As used herein, "active agent" or "household care active agent" or "fabric care active agent" refers to any ingredient that may provide a benefit, either directly or indirectly, to the one or more fabrics. Non-limiting examples of benefits and/or improvements to a fabric include cleaning (for example by surfactants), stain removal, stain reduction, wrinkle removal, color restoration, static control, wrinkle resistance, permanent press, wear reduction, wear resistance, pill removal, pill resistance, soil removal, soil resistance (including soil release), shape retention, shrinkage reduction, softness, fragrance, anti-bacterial, anti-viral, odor resistance, and odor removal.

As used herein, the term "discrete" refers to particles that are structurally distinctive from each other either under naked human eyes or under electronic imaging devices, such as scanning electron microscope (SEM) and transmission electron microscope (TEM). Preferably, the discrete particles of the present invention are structurally distinctive from each other under naked human eyes.

The terms "fibrous element" and "filaments" are used interchangeably here to refer to elongated particles having a length greatly exceeding its average cross-sectional diameter, i.e., a length-to-diameter aspect ratio of at least 10:1, and preferably such elongated particles have an average cross-sectional diameter of no more than 1 mm.

As used herein, "Hydrophilic Index" or "HI" of a surfactant is calculated by the following equation:

$$HI = \frac{M_h}{M_T} \times 20$$

wherein $M_h$ is the molecular weight of all hydrophilic groups in the surfactant, wherein MT is the total molecular weight of the surfactant. Both $M_h$ and MT refer to weight average molecular weights. For example, linear alkylbenzene sulfonate with an average alkyl chain length of about 11.8 has a HI value of about 4.97. For another example, $C_{12}$-$C_{14}$ alkyl sulfate has a HI value of about 6.98. For yet another example, $C_{12}$-$C_{14}$ alkyl ethoxylated sulfate with an average ethoxylation degree of about 1 has a HI value of about 8.78, and $C_{12}$-$C_{14}$ alkyl ethoxylated sulfate with an average ethoxylation degree of about 3 has a HI value of about 11.57. For still another example, $C_{14}$-$C_{15}$ alkyl ethoxylated alcohol with an average ethoxylation degree of about 7 has a HI value of about 12.73, and $C_{12}$-$C_{14}$ alkyl ethoxylated alcohol with an average ethoxylation degree of about 9 has a HI value of about 14.72.

As used herein, the terms "include," "includes" and "including" are meant to be non-limiting.

As used herein, the term "particle" refers to a solid matter of minute quantity, such as a powder, granule, encapsulate, microcapsule, and/or prill. The particles of the present invention can be spheres, rods, plates, tubes, squares, rectangles, discs, stars or flakes of regular or irregular shapes, but they are non-fibrous.

The term "substantially free of" or "substantially free from" as used herein refers to either the complete absence of an ingredient or a minimal amount thereof merely as impurity or unintended byproduct of another ingredient. A composition that is "substantially free" of/from a component means that the composition comprises less than about 0.5%, 0.25%, 0.1%, 0.05%, or 0.01%, or even 0%, by weight of the composition, of the component.

As used herein, the term "unitary" refers to a structure containing a plurality of distinctive parts that are combined together to form a visually coherent and structurally integral article.

As used herein, the term "water-soluble" refers to the ability of a sample material to completely dissolve in or disperse into water leaving no visible solids or forming no visibly separate phase, when at least about 25 grams, preferably at least about 50 grams, more preferably at least about 100 grams, most preferably at least about 150 grams, of such material is placed in one liter (1 L) of deionized water at 20° C. and under the atmospheric pressure with sufficient stirring. In other words, the unit dose article or fibrous element is capable of forming a homogeneous solution with water at ambient conditions. "Ambient conditions" as used herein means 23° C.±1.0° C. and a relative humidity of 50%±2%. The water-soluble unit dose article 1 is a unitary product that a consumer would retrieve from the unit dose article's 1 packaging and place within a washing machine.

As used herein the phrases "fabric care composition" and "fabric care product" includes compositions and formulations designed for treating fabric. Such compositions include but are not limited to, laundry cleaning compositions and detergents, fabric softening compositions, fabric enhancing compositions, fabric freshening compositions, laundry pre-wash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

It should be understood that the term "comprise" includes also embodiments where the term "comprises" means "consists of" or "consists essentially of."

In this description, all concentrations and ratios are on a weight basis of the composition unless otherwise specified. All temperatures herein are in degrees Celsius (° C.) unless otherwise indicated. All conditions herein are at 20° C. and under the atmospheric pressure, unless otherwise specifically stated. All molecular weights are determined by weight average number molecular weight unless otherwise specifically noted.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

A water-soluble unit dose article 5 is shown in FIG. 1. The water-soluble unit dose article 5 can comprise a water soluble fibrous first ply 10 and water soluble fibrous second ply 15 that are superposed relative to one another. The first ply 10 and second ply 15 are joined to one another to form a unitary water-soluble unit dose article 5. The water-soluble unit dose article 5 can have a mass from about 50 mg to about 30 g, optionally about 100 mg to about 20 g, optionally about 1 g to about 20 g. The water-soluble unit dose article 5 can have a length and width from about 5 mm to about 20 cm, optionally from about 1 cm to about 10 cm, and a thickness from about 1 mm to about 2 cm, optionally about 2 mm to about 10 mm.

For the types of water soluble fibrous plies described herein, it can be challenging to manufacture an individual ply that is rigid enough so as not to be floppy when the consumer uses the product. The water-soluble unit dose article may have planar area of between about 1 cm$^2$ and about 100 cm$^2$. The stiffness of a fibrous ply can be function of thickness of the ply, the strength and stiffness of the individual fibers constituting the ply, the quantity of inter-fiber bonds, the degree and nature of entanglement of the fibers, and the strength of the inter-fiber bonds. For the fibers constituting the fibrous plies discussed herein, it can be difficult to provide for sufficiently thick ply, having sufficiently strong and stiff water soluble fibers, that are sufficiently inter-bonded and entangled with one another in a desired structure, and bonded with one another such that a ply made of such fibers is not floppy under its self-weight.

Providing a multi-ply water-soluble unit dose article 5 can help to overcome these limitations. The increased thickness of the water-soluble unit dose article achieved by layering and joining plies can provide for higher in-plane bending stiffness since the moment of inertia about the bending axis is increased. Such articles 5 are not as floppy as thinner single ply articles. Further, the increased thickness of such articles 5 make them easier for the consumer to grasp and handle. Further multi-ply articles 5 provide for positions interior to the article where active agents, such as perfume, can be placed so that the consumer does not come into contact with the active agent.

The plies of the water-soluble unit dose article 5 can be viewed hierarchically starting from the form in which the consumer interacts with the water soluble article 5 and working backward to the raw materials from which the plies are made.

I. Fibrous Plies

A. Fibrous Structures

The fibrous plies can be fibrous structures. Fibrous structures comprise one or more fibrous elements. The fibrous elements can be associated with one another to form a structure. Fibrous structures can include particles within and or on the structure. Fibrous structures can be homogeneous, layered, unitary, zoned, or as otherwise desired, with different active agents defining the various aforesaid portions.

Figure 2:
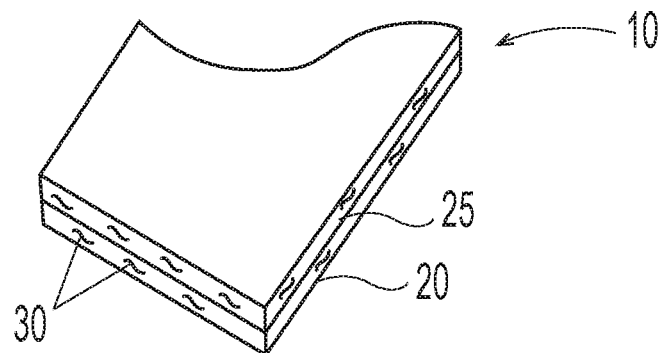
FIG. 2 is a first ply having a first layer and a second layer.

A fibrous structure can comprise one or more layers, the layers together forming the ply. For instance, as shown in FIG. 2, the first ply 10 can comprise a first layer 20 and a second layer 25. The first layer 20 and second layer 25 can comprise a plurality of fibrous elements 30. The first ply 10 can comprise a plurality of particles at a location selected from the group consisting of the first layer 20, the second layer 25, between the first layer 20 and second layer 25, and combinations thereof. A ply having a plurality of layers can be formed by depositing a plurality of fibrous elements 30 having a distinguishing characteristic to form a first layer 20 and then depositing a second layer 25 of fibrous elements 30 on top of the first layer 20. For clarity, for multilayer plies, there can be intermingling of fibers constituting the layers. Further, for clarity, there can be intermingling of fibers constituting the plies.

A fibrous structure can comprise a plurality of identical or substantially identical from a compositional perspective of fibrous elements 30. Optionally, the fibrous structure may comprise two or more different fibrous elements 30. Non-limiting examples of differences in the fibrous elements 30 may be physical differences such as differences in diameter, length, texture, shape, rigidness, elasticity, and the like; chemical differences such as crosslinking level, solubility, melting point, glass transition temperature, active agent, filament-forming material, color, level of active agent, basis weight, level of filament-forming material, presence of any coating on fibrous element, biodegradable or not, hydrophobic or not, contact angle, and the like; differences in whether the fibrous element 30 loses its physical structure when the fibrous element is exposed to conditions of intended use; differences in whether the fibrous element's 30 morphology changes when the fibrous element 30 is exposed to conditions of intended use; and differences in rate at which the fibrous element 30 releases one or more of its active agents when the fibrous element 30 is exposed to conditions of intended use. In one example, two or more fibrous elements 30 and/or particles within the fibrous structure may comprise different active agents.

The fibrous structure may exhibit different regions, such as different regions of basis weight, density and/or caliper, surface texture, pattern of fibrous structure, embossing pattern, apertures, apertures in a pattern, and the like.

Non-limiting examples of use of the fibrous structure of the present invention include, but are not limited to household care compositions, including fabric care compositions.

The fibrous structure of the present invention may be used as is or may be coated with one or more active agents.

B. Fibrous Elements

The fibrous elements 30 may be water soluble. The fibrous elements 30 can comprise constituent material selected from the group consisting of one or more filament forming materials, one or more active agents, and combinations thereof. The active agents may be releasable from the fibrous elements 30, such as when the fibrous element 30 and/or fibrous structure comprising the fibrous element 30 is exposed to conditions of intended use.

The fibrous elements can comprise from about 5% to about 100% by weight on a dry fibrous element basis and/or dry fibrous structure basis of one or more filament-forming materials. The fibrous elements can comprise from about 5% to about 100% by weight on a dry fibrous element basis and/or dry fibrous structure basis of one or more filament-forming materials and from about 5% to about 95% by weight by weight on a dry fibrous element basis and/or dry fibrous structure basis one or more active agents.

The fibrous elements can comprise more than about 50% by weight on a dry fibrous element basis and/or dry fibrous structure basis of one or more filament-forming materials and less than about 50% by weight on a dry fibrous element basis and/or dry fibrous structure basis of one or more active agents.

The fibrous elements can comprise less than about 50% by weight on a dry fibrous element basis and/or dry fibrous structure basis of one or more filament-forming materials and more than about 50% by weight on a dry fibrous element basis and/or dry fibrous structure basis of one or more active agents.

A fibrous element 30 can comprise one or more filament-forming materials and one or more active agents selected from the group consisting of: enzymes, bleaching agents, builder, chelants, sensates, dispersants, perfumes, antimicrobials, antibacterials, antifungals, and mixtures thereof that are releasable and/or released when the fibrous element and/or fibrous structure comprising the fibrous element is exposed to conditions of intended use.

The fibrous elements 30 may be meltblown fibrous elements 30, spunbond fibrous elements 30, hollow fibrous elements 30, or the like. The fibrous elements 30 may be hydrophilic or hydrophobic. The fibrous elements 30 may be surface treated and/or internally treated to change the inherent hydrophilic or hydrophobic properties of the fibrous element. The fibrous elements 30 can have a diameter of less than about 100 μm and/or less than about 75 μm and/or less than about 50 μm and/or less than about 25 μm and/or less than about 10 μm and/or less than about 5 μm and/or less than about 1 μm as measured according to the Diameter Test Method described herein. The fibrous elements 30 can have a diameter from about 1 μm to about 500 μm, optionally about 1 μm to about 100 μm, optionally about 1 μm to about 50 μm, optionally about 1 μm to about 30 μm, optionally about 5 μm to about 15 μm, optionally about 7 μm to about 15 μm according to the Diameter Test Method described herein. The fibrous elements 30 can have a diameter of greater than about 1 μm as measured according to the Diameter Test Method described herein. The smaller the diameter the faster the rate of release of the active agents and the rate of loss and or altering of the fibrous element's 30 physical structure.

The fibrous element 30 may comprise an active agent within the fibrous element and an active agent on an external surface of the fibrous element 30, such as an active agent coating on the fibrous element 30. The active agent on the external surface of the fibrous element 30 may be the same or different from the active agent present in the fibrous element 30. If different, the active agents may be compatible or incompatible with one another.

The one or more active agents may be uniformly distributed or substantially uniformly distributed throughout the fibrous element 30. The active agents may be distributed as discrete regions within the fibrous element 30. The at least one active agent can be distributed uniformly or substantially uniformly throughout the fibrous element 30 and at least one other active agent is distributed as one or more discrete regions within the fibrous element 30. Optionally, at least one active agent is distributed as one or more discrete regions within the fibrous element 30 and at least one other active agent is distributed as one or more discrete regions different from the first discrete regions within the fibrous element 30.

C. Filament Forming Material

The filament-forming material is any suitable material, such as a polymer or monomers capable of producing a polymer that exhibits properties suitable for making a filament, such as by a spinning process. The filament-forming material may comprise a polar solvent-soluble material, such as an alcohol-soluble material and/or a water-soluble material, which can be beneficial for product applications that include use of water.

The filament-forming material may comprise a non-polar solvent-soluble material.

The filament-forming material may comprise a water-soluble material and be free (less than 5% and/or less than 3% and/or less than 1% and/or 0% by weight on a dry fibrous element basis and/or dry fibrous structure basis) of water-insoluble materials.

The filament-forming material may comprise a polymer selected from the group consisting of: polymers derived from acrylic monomers such as the ethylenically unsaturated carboxylic monomers and ethylenically unsaturated monomers, polyvinyl alcohol, polyvinylformamide, polyvinylamine, polyacrylates, polymethacrylates, copolymers of acrylic acid and methyl acrylate, polyvinylpyrrolidones, polyalkylene oxides, starch and starch derivatives, pullulan, gelatin, and cellulose derivatives (for example, hydroxypropylmethyl celluloses, methyl celluloses, carboxymethy celluloses).

The filament-forming material may comprise a polymer selected from the group consisting of: polyvinyl alcohol, polyvinyl alcohol derivatives, starch, starch derivatives, cellulose derivatives, hemicellulose, hemicellulose derivatives, proteins, sodium alginate, hydroxypropyl methylcellulose, chitosan, chitosan derivatives, polyethylene glycol, tetramethylene ether glycol, polyvinyl pyrrolidone, hydroxymethyl cellulose, hydroxyethyl cellulose, carboxymethyl cellulose, and mixtures thereof.

The filament-forming material may comprise a polymer selected from the group consisting of: pullulan, hydroxypropylmethyl cellulose, hydroxyethyl cellulose, hydroxypropyl cellulose, polyvinyl pyrrolidone, carboxymethylcellulose, sodium alginate, xanthan gum, tragacanth gum, guar gum, acacia gum, Arabic gum, polyacrylic acid, methylmethacrylate copolymer, carboxyvinyl polymer, dextrin, pectin, chitin, levan, elsinan, collagen, gelatin, zein, gluten, soy protein, casein, polyvinyl alcohol, carboxylated polyvinyl alcohol, sulfonated polyvinyl alcohol, starch, starch derivatives, hemicellulose, hemicellulose derivatives, proteins, chitosan, chitosan derivatives, polyethylene glycol, tetramethylene ether glycol, hydroxymethyl cellulose, and mixtures thereof.

1. Water-Soluble Materials

Non-limiting examples of water-soluble materials include water-soluble polymers. The water-soluble polymers may be synthetic or natural original and may be chemically and/or physically modified.

Non-limiting examples of water-soluble polymers include water-soluble hydroxyl polymers, water-soluble thermoplastic polymers, water-soluble biodegradable polymers, water-soluble non-biodegradable polymers and mixtures thereof. The water-soluble polymer may comprise polyvinyl alcohol. In another example, the water-soluble polymer may comprise starch. The water-soluble polymer may comprise polyvinyl alcohol and starch. The water-soluble polymer may comprise carboxymethyl cellulose. The polymer may comprise carboxymethyl cellulose and polyvinyl alcohol.

a. Water-Soluble Hydroxyl Polymers

Non-limiting examples of water-soluble hydroxyl polymers in accordance with the present invention can be selected from the group consisting of polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose derivatives such as cellulose ether and ester derivatives, cellulose copolymers, hemicellulose, hemicellulose derivatives, hemicellulose copolymers, gums, arabinans, galactans, proteins, carboxymethylcellulose, and various other polysaccharides and mixtures thereof.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, maleic acid, itaconic acid, sodium vinylsulfonate, sodium allylsulfonate, sodium methylallyl sulfonate, sodium phenylallylether sulfonate, sodium phenylmethallylether sulfonate, 2-acrylamido-methyl propane sulfonic acid (AMPs), vinylidene chloride, vinyl chloride, vinyl amine and a variety of acrylate esters.

In one example, the water-soluble hydroxyl polymer is selected from the group consisting of: polyvinyl alcohols, hydroxymethylcelluloses, hydroxyethylcelluloses, hydroxypropylmethylcelluloses, carboxymethylcelluloses, and mixtures thereof. A non-limiting example of a suitable polyvinyl alcohol includes those commercially available from Sekisui Specialty Chemicals America, LLC (Dallas, Tex.) under the CELVOL (Registered trademark) trade name. Another non-limiting example of a suitable polyvinyl alcohol includes G Polymer commercially available from Nippon Ghosei. A non-limiting example of a suitable hydroxypropylmethylcellulose includes those commercially available from the Dow Chemical Company (Midland, Mich.) under the METHOCEL (Registered trademark) trade name including combinations with above mentioned polyvinyl alcohols.

b. Water-Soluble Thermoplastic Polymers

Non-limiting examples of suitable water-soluble thermoplastic polymers include thermoplastic starch and/or starch derivatives, polylactic acid, polyhydroxyalkanoate, polycaprolactone, polyesteramides and certain polyesters, and mixtures thereof. The water-soluble thermoplastic polymers may be hydrophilic or hydrophobic. The water-soluble thermoplastic polymers may be surface treated and/or internally treated to change the inherent hydrophilic or hydrophobic properties of the thermoplastic polymer. The water-soluble thermoplastic polymers may comprise biodegradable polymers. Any suitable weight average molecular weight for the thermoplastic polymers may be used. For example, the weight average molecular weight for a thermoplastic polymer in accordance with the present invention can be greater than about 10,000 g/mol and/or greater than about 40.000 g/mol and/or greater than about 50,000 g/mol and/or less than about 500,000 g/mol and/or less than about 400,000 g/mol and/or less than about 200,000 g/mol.

D. Filament-Forming Composition

The fibrous elements 30 of the present invention are made from a filament-forming composition. The filament-forming composition can be a polar-solvent-based composition. In one example, the filament-forming composition is an aqueous composition comprising one or more filament-forming materials and one or more active agents.

The filament-forming composition of the present invention may have a shear viscosity as measured according to the Shear Viscosity Test Method described herein of from about 1 Pascal·Seconds to about 25 Pascal·Seconds and/or from about 2 Pascal·Seconds to about 20 Pascal·Seconds and/or from about 3 Pascal·Seconds to about 10 Pascal·Seconds, as measured at a shear rate of 3,000 sec−1 and at the processing temperature (50 deg. C. to 100 deg. C.). The filament-forming composition may be processed at a temperature of from about 25 deg. C. to about 100 deg. C. and/or from about 65 deg. C. to about 95 deg. C. and/or from about 70 deg. C. to about 90 deg. C. when making fibrous elements 30 from the filament-forming composition.

In one example, the filament-forming composition may comprise at least 20% and/or at least 30% and/or at least 40% and/or at least 45% and/or at least 50% to about 90% and/or to about 85% and/or to about 80% and/or to about 75% by weight of one or more filament-forming materials, one or more active agents, and mixtures thereof. The filament-forming composition may comprise from about 10% to about 80% by weight of a polar solvent, such as water.

In a fibrous element spinning process, the fibrous elements 30 need to have initial stability as they leave the spinning die. Capillary number is used to characterize this initial stability criterion. At the conditions of the die, the capillary number can be from about 0.5 to about 10, at least 1 and/or at least 3 and/or at least 4 and/or at least 5.

In one example, the filament-forming composition exhibits a capillary number of from about 1 to about 50 and/or about 3 to about 50 and/or about 5 to about 30 such that the filament-forming composition can be effectively polymer processed into a fibrous element.

"Polymer processing" as used herein means any spinning operation and/or spinning process by which a fibrous element comprising a processed filament-forming material is formed from a filament-forming composition. The spinning operation and/or process may include spunbonding, melt blowing, electro-spinning, rotary spinning, continuous filament producing and/or tow fiber producing operations/processes. A "processed filament-forming material" as used herein means any filament-forming material that has undergone a melt processing operation and a subsequent polymer processing operation resulting in a fibrous element.

The capillary number is a dimensionless number used to characterize the likelihood of this droplet breakup. A larger capillary number indicates greater fluid stability upon exiting the die. The capillary number, $c_a$, is defined as follows:

$$c_a = \frac{V\eta}{\sigma}$$

Where V is the average fluid velocity at the die exit (units of Length per Time), $\eta$ is the fluid viscosity at the conditions of the exit of the die (units of Mass per Length*Time), $\sigma$ is the surface tension of the fluid (units of Mass per Time$^2$).

In one example, the filament-forming composition may comprise one or more release agents and/or lubricants. Non-limiting examples of suitable release agents and/or lubricants include fatty acids, fatty acid salts, fatty alcohols, fatty esters, sulfonated fatty acid esters, fatty amine acetates and fatty amides, silicones, aminosilicones, fluoropolymers and mixtures thereof. In one example, the filament-forming composition may comprise one or more antiblocking and/or detackifying agents. Non-limiting examples of suitable antiblocking and/or detackifying agents include starches, modified starches, crosslinked polyvinylpyrrolidone, crosslinked cellulose, microcrystalline cellulose, silica, metallic oxides, calcium carbonate, talc and mica.

Active agents of the present invention may be added to the filament-forming composition prior to and/or during fibrous element formation and/or may be added to the fibrous element after fibrous element formation. For example, a perfume active agent may be applied to the fibrous element and/or fibrous structure comprising the fibrous element after the fibrous element and/or fibrous structure according to the present invention are formed. In another example, an enzyme active agent may be applied to the fibrous element and/or fibrous structure comprising the fibrous element after the fibrous element and/or fibrous structure according to the present invention are formed. In still another example, one or more particles, which may not be suitable for passing through the spinning process for making the fibrous element, may be applied to the fibrous element and/or fibrous structure comprising the fibrous element after the fibrous element and/or fibrous structure according to the present invention are formed.

E. Extensional Aids

In one example, the fibrous element comprises an extensional aid. Non-limiting examples of extensional aids can include polymers, other extensional aids, and combinations thereof. High molecular weight extensional aids can be used since they have the ability to increase extensional melt viscosity and reduce melt fracture.

The extensional aid, when used in a meltblowing process, is added to the composition of the present invention in an amount effective to visibly reduce the melt fracture and capillary breakage of fibers during the spinning process such that substantially continuous fibers having relatively consistent diameter can be melt spun. The extensional aids can be present from about 0.001% to about 10%, by weight on a dry fibrous element basis and/or dry particle basis and/or dry fibrous structure basis, in one example, and in another example from about 0.005 to about 5%, by weight on a dry fibrous element basis and/or dry particle basis and/or dry fibrous structure basis, in yet another example from about 0.01 to about 1%, by weight on a dry fibrous element basis and/or dry particle basis and/or dry fibrous structure basis, and in another example from about 0.05% to about 0.5%, by weight on a dry fibrous element basis and/or dry particle basis and/or dry fibrous structure basis.

Non-limiting examples of polymers that can be used as extensional aids can include alginates, carrageenans, pectin, chitin, guar gum, xanthum gum, agar, gum arabic, karaya gum, tragacanth gum, locust bean gum, alkylcellulose, hydroxyalkylcellulose, carboxyalkylcellulose, and mixtures thereof. Nonlimiting examples of other extensional aids can include modified and unmodified polyacrylamide, polyacrylic acid, polymethacrylic acid, polyvinyl alcohol, polyvinylacetate, polyvinylpyrrolidone, polyethylene vinyl acetate, polyethyleneimine, polyamides, polyalkylene oxides including polyethylene oxide, polypropylene oxide, polyethylenepropylene oxide, and mixtures thereof.

F. Method for Making Fibrous Elements and Plies

Figure 3:
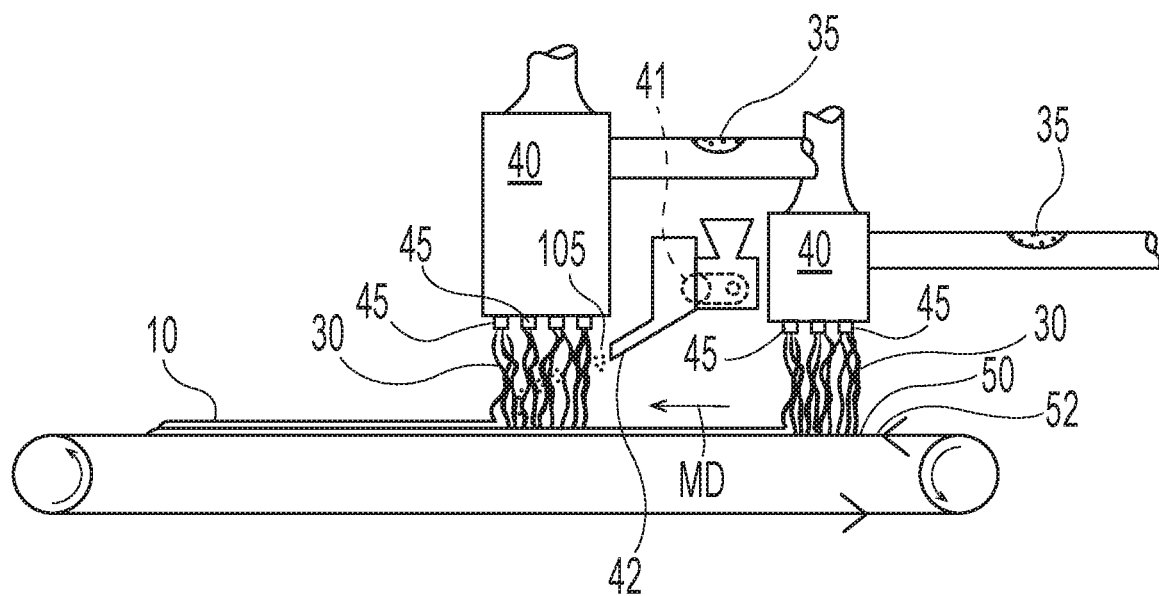
FIG. 3 a manufacturing line for making plies of material.

The fibrous elements 30 and plies formed therefrom may be made by any suitable process. A non-limiting example of a suitable process for making the plies and continuous ply webs is shown in FIG. 3. A solution of a filament forming composition 35 is provided. The filament forming composition can comprise one or more filament forming materials and optionally one or more active agents. The filament forming composition 35 is passed through one or more die block assemblies 40 comprising a plurality of spinnerets 45 to form a plurality of fibrous elements 30 comprising the one or more filament forming materials and optionally one or more active agents. Multiple die block assemblies 40 can be employed to spin different layers of fibrous elements 30, with the fibrous elements 30 of different layers having a composition that differ from one another or are the same as one another. That is, the filament forming composition 35 provided to one die block assembly 40 can differ compositionally from the filament forming composition 35 provided to another die block assembly 40. More than two die block assemblies in series can be provided to form three, four, or any other integer number of layers in a given ply.

The fibrous elements 30 can be deposited on a belt 50 moving in a machine direction MD to form a first ply 10. The belt 50 can be a foraminous belt.

Belts 50 that are air permeable are desirable so that vacuum can be applied to and through the belt. The belt 50 can be a XBE2A9 belt available from F.N. Sheppard & Co. Erlanger, Ky., USA. The belt 50 can be formed from polyester strands or other polymeric strands. It is desirable that the belt 50 have small openings so that the web carried thereon is not deformed into the openings. The belt 50 can be coated to lower the surface tension of the belt 50 with respect to the web carried thereon. The belt 50 can move at a speed from about 1 m/min to about 100 m/min. optionally about 2 m/min to about 30 m/min.

The motive force to move the continuous ply webs disclosed herein may be provide by one or more belts 50. As the belt 50 moves the continuous ply webs ride directly or indirectly through another material, for example another continuous ply web, on the belt 50. For locations at which the continuous ply web are not in contact with a belt 50, tensile force mobilized in the continuous ply web downstream of the location at which the continuous ply web loses contact with the belt 50 can pull the continuous ply web along. Optionally, when a continuous ply web is off of the belt, motive force can be provided by motorized rollers.

The spinnerets 45 may comprise a plurality of fibrous element-forming holes that include a melt capillary encircled by a concentric attenuation fluid hole through which a fluid, such as air at a temperature from about 10 C to about 100 C, can pass to facilitate attenuation of the filament-forming composition 35 into a fibrous element 30 as it exits the fibrous element-forming hole. The filament-forming composition can be provided to the fibrous-element forming hole at a rate of about 0.1 to about 2 g/min per hole, which can be set based on the composition of the filament-forming composition.

During the spinning step, volatile solvent, such as water, present in the filament-forming composition 35 can be removed, such as by drying, as the fibrous element 30 is formed. Greater than 30% and/or greater than 40% and/or greater than 50%, and/or greater than 60% of the weight of the filament-forming composition's volatile solvent, such as water, can be removed during the spinning step, such as by drying the fibrous element being produced.

The filament-forming composition is spun into one or more fibrous elements 30 and/or particles by any suitable spinning process, such as meltblowing, spunbonding, electro-spinning, and/or rotary spinning. In one example, the filament-forming composition is spun into a plurality of fibrous elements 30 and/or particles by meltblowing. For example, the filament-forming composition may be pumped from a tank to a meltblown spinnerette. Upon exiting one or more of the filament-forming holes in the spinnerette, the filament-forming composition is attenuated with air to create one or more fibrous elements 30 and/or particles. The fibrous elements 30 and/or particles may then be dried to remove any remaining solvent used for spinning, such as the water.

The fibrous elements 30 and/or particles of the present invention may be collected on a belt, such as a patterned belt or flat belt, to form a fibrous structure comprising the fibrous elements 30 and/or particles that are directed into the fibrous elements 30 30.

Particles can be introduced into the stream of the fibrous elements 30 between the die block assembly 40 and the belt 50. Particles can be fed from a particle receiver onto a belt feeder 41 or optionally a screw feeder. The belt feeder 41 can be set and controlled to deliver the desired mass of particles into the process. The belt feeder can feed an air knife 42 that suspends and directs the particles in an air stream into the fibrous elements 30 to form a mixture of coming led fibrous elements 30 and particles that are subsequently deposited on the belt 50. Optionally, particles can be introduced after the fibrous elements 30 are deposited on the belt 50. Optionally, the particles can be introduced by gravity and or optionally in between streams of filament-forming composition. An air laid forming head or sifter can be used to introduce the particles.

Multi-layer plies can be formed by providing two die block assemblies 40, one die block assembly 40 downstream of another die block assembly 40, by way of nonlimiting example as shown in FIG. 3.

A pressurized tank suitable for batch operation can be filled with a suitable filament-forming composition 35 for spinning. A pump, such as a ZENITH, type PEP II, having a capacity of 5.0 cubic centimeters per revolution (cc/rev), manufactured by Parker Hannifin Corporation, Zenith Pumps division, of Sanford, N.C., USA may be used to facilitate transport of the filament-forming composition 35 to the spinnerets 45.

The die block assembly 40 can have several rows of circular extrusion nozzles (fibrous element-forming holes) spaced from one another at a pitch P of about 1.524 millimeters. The nozzles can have individual inner diameters of about 0.305 millimeters and individual outside diameters of about 0.813 millimeters. Each individual nozzle can be encircled by an annular and divergently flared orifice (concentric attenuation fluid hole to supply attenuation air to each individual melt capillary). The filament-forming composition 35 extruded through the nozzles can be surrounded and attenuated by generally cylindrical, humidified air streams supplied through the orifices.

Attenuation air can be provided by heating compressed air from a source by an electrical-resistance heater, for example, a heater manufactured by Chromalox, Division of Emerson Electric, of Pittsburgh, Pa., USA. An appropriate quantity of steam can be added to saturate or nearly saturate the heated air at the conditions in the electrically heated, thermostatically controlled delivery pipe. Condensate can be removed in an electrically heated, thermostatically controlled, separator.

The embryonic fibrous elements 30 can be dried by a drying air stream having a temperature from about 149 C to about 315 C by an electrical resistance heater supplied through drying nozzles and discharged at an angle of about 90 degrees or less relative to the general orientation of the non-thermoplastic embryonic fibers being extruded. The dried embryonic fibrous elements 30 can be collected on a collection device, such as a movable foraminous belt, patterned collection belt, or flat belt. The addition of a vacuum source directly under the formation zone may be used to aid collection of the fibers.

II. Process for Manufacturing a Water Soluble Product

The various water soluble fibrous plies disclosed herein can be used to manufacture water soluble products 5. The process for manufacturing can be performed on discrete plies of material. Discrete plies of material are individual pieces of the various plies described herein that are assembled and joined in some manner to form a single water soluble product 5. Optionally, the process for manufacturing can be performed on continuous ply webs described herein that are assembled and joined in some manner and are cut to form multiple water soluble products 5.

Figure 4:
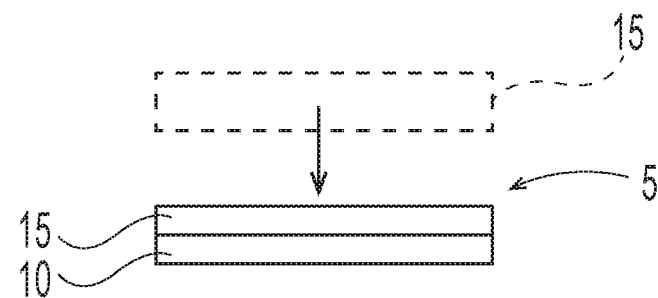
FIG. 4 is a second ply being joined to a first ply to form a product.

The process of manufacturing a water soluble product 5 can comprise the following steps as illustrated in FIG. 4. A water soluble first ply 10 can be provided. A water soluble second ply 15 can be provided separate from the first ply 10. The first ply 10 and the second ply 15 are superposed with one another. By superposed it is meant that one is positioned above or below the other with the proviso that additional plies or other materials, for example active agents, such as perfume, may be positioned between the superposed plies. A portion of the first ply 10 can be joined to a portion of the second ply 15 to form the water soluble product 5. Importantly, the second ply 15 can be formed on a surface 52 other than the first ply 10. That is second ply 15 is optionally not formed on the first ply 10 as might occur if a plurality of fibrous elements 30 are discharged from a first die block assembly 40 onto a belt 50 to form a first ply 10 of material and then another plurality of fibrous elements 30 is discharged from a second die block assembly 40 on top of the first ply 10 to form a second ply 15 on top of the first ply 10.

Each ply may comprise one or more layers. A ply formed of multiple layers can have coherency amongst two or more of the layers to form an integral ply. There can be intermingling of fibers constituting layers of a ply and intermingling of fibers between plies that are next to one another.

The second ply 15 can be cut from the first ply 10, in which case the second ply 15 and first ply 10 can be formed on the same forming surface and be integral with one another at the time and location of formation. It might be advantageous to not form one ply on top of another because such a construction will have one surface that is a belt side having a texture that might differ from the air side of the of such construction. That can make it difficult to print on both sides of the product 5, result in one side being more prone to leak particles as compared to another side if particles are provided in or on a layer, and result in a product 5 that has one side that differs in surface texture or hand than the other, which can be confusing to a consumer as he or she may think that the different sides of the product 5 may have a different function.

By joined it is meant that the elements are attached or connected directly to one another or are attached or connected to one another indirectly through one or more intermediate elements that are attached or connected to the element being referred to as joined.

Figure 5:
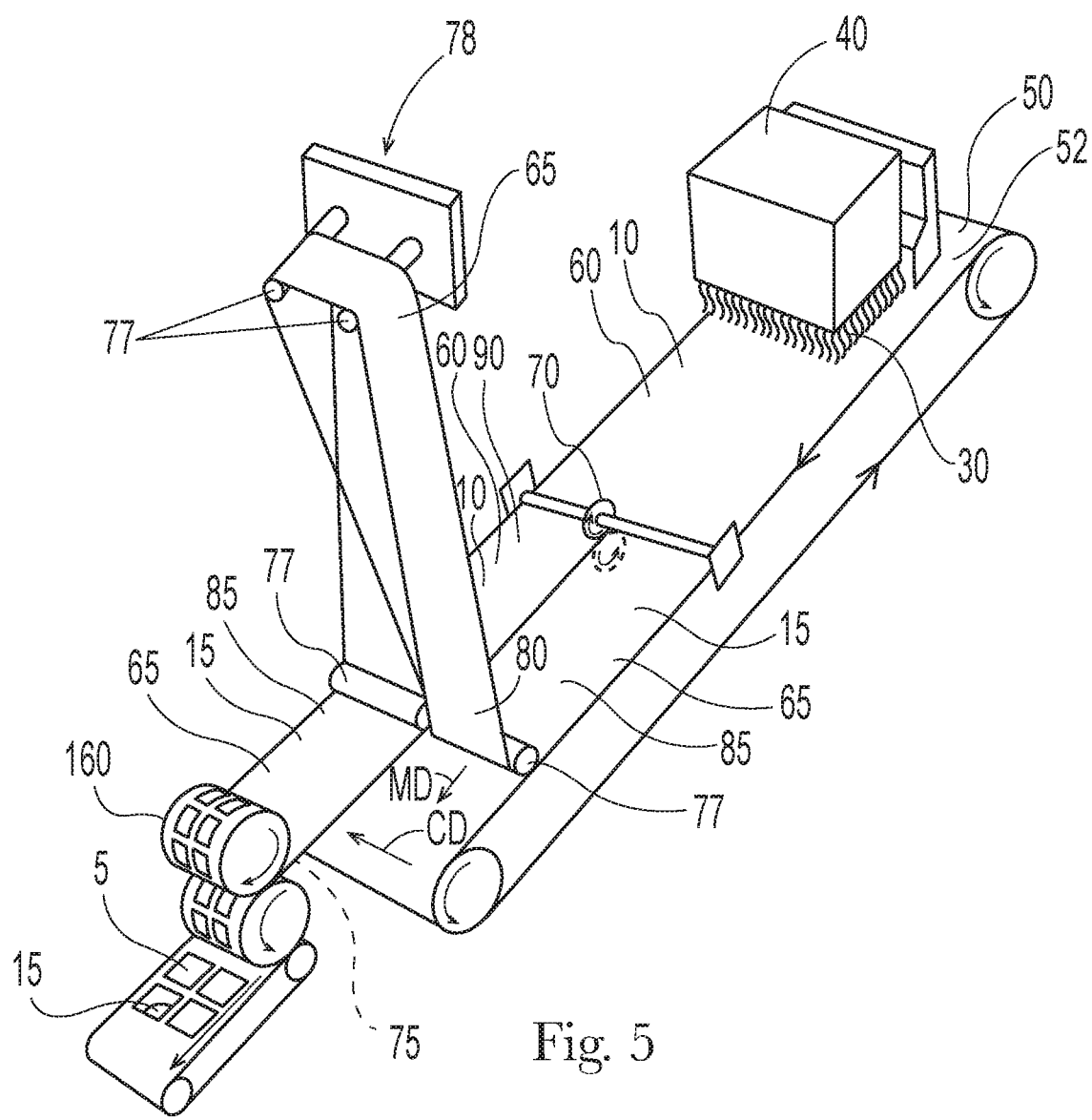
FIG. 5 is a manufacturing line for making a two-ply product.

More practically, the first ply 10 can be provided as part of a first continuous ply web 60 and the second ply 15 can be provided as part of a second continuous ply web 65, by way of non-limiting example as shown in FIG. 5. FIG. 5 is a nonlimiting example of how a two-ply product 5 can be formed. First continuous ply web 60 and the second continuous ply web 65 can be superposed to superpose what ultimately becomes the first ply 10 and the second ply 15 in a product 5. At this stage of the process, what ultimately becomes the individual water soluble products 5 can be part of a continuous multi-ply webs. There can be intermingling of fibers constituting the plies. This may occur when the plies forming the product 5 are brought into contact with one another and or bonded to one another.

It can be practical to spin a first continuous ply web 60 having a width from about 20 cm to about 500 cm, or from about 20 cm to about 100 cm, or from about 20 cm to about 80 cm, or from about 40 cm to about 70 cm, or about 60 cm. Such a first continuous ply web 60 can be cut in the machine direction MD to form multiple plies that can be stacked form one or more products 5 in on or more lanes of product 5 production. For instance, it can be practical to provide a first continuous ply web 60 that is about 60 cm wide and cut it into three continuous plies each having a width of about 20 cm, stack those three continuous plies, join those three plies together, to form two or more products 5 in the cross direction CD.

In FIG. 5, product 5 making reduces down to a single lane with the potential for making multiple products 5 in the cross direction. Optionally, there can be multiple product making lanes fed by a wide web formed from a wide die assembly 40. The wide web can be slit in the machine direction to form a plurality of first continuous ply webs 60 and second continuous ply webs 65 so that multiple lanes of product making are possible. For example, a duplicate of the apparatus shown in FIG. 5 could be positioned immediately next to the apparatus shown in FIG. 5 but a single die assembly 40 could feed a wide continuous ply web into the individual lanes of product making, with the cutting knife 70 configured to separate out the continuous ply webs as appropriate to feed the individual lanes of product 5 making.

After the step of superposing the first ply 10 and second ply 15, the superposed first continuous ply web 60 and second continuous ply web 65 can be joined to one another and cut to form the water soluble product 5. A first portion 11 of the first ply 10 can be joined to a second portion 16 of the second ply 15 to the water soluble product 5.

The first continuous ply web 60 can be provided separately from the second continuous ply web 65. For instance, the first continuous ply web 60 can be formed using a die block assembly 40 that is separate from the die block assembly 40 used to make the second continuous ply web 65. Optionally the first continuous ply web 60 and second continuous ply web 65 can be supplied as separate parent rolls of such materials. It can be practical to employ a continuous process from formation of the plies to finished product 5 because it can be challenging to handle and store water soluble fibrous webs.

The second continuous ply web 65 can be cut from the first continuous ply web 60. For instance, the first continuous ply web 60 can be formed on a die block assembly 40 and then cut in the machine direction MD by a knife 70, as shown in FIG. 5, for instance a rotary cutting knife that cuts in the machine direction MD. Cutting ply webs from the first continuous ply web 60 can be practical for providing better manufacturing quality control since only a single die block assembly must be controlled and control ends up being universally applied to each ply web. This contrasts to the situation in which one die block is used to form one ply and another die block is used to form another ply and both die blocks must be carefully monitored and controlled. Also, such an arrangement can be helpful for minimizing trimming waste that might be required for edges of the ply web which may be thinner than portions of the ply web nearer to the centerline of the ply web in the machine direction MD. Thin edges of the plies can result in the need to process and handle plies and products 5 that have a nonuniform caliper, for instance by trimming edges having reduced caliper or paying careful attention to the orientation in which plies are superposed to form a product 5.

The process can further comprise a step of positioning the first ply belt side 75 and the second ply belt side 80 to face away from one another prior to joining the first ply 10 and the second ply 15. This can be accomplished by providing only a single 180 degree twist in the second continuous ply web 65. The first ply belt side 75 is the side of the first ply 10 that was formed in contact with a surface 52 or belt 50. In FIG. 5, the second continuous ply web 65 is twisted 90 degrees twice so that the second ply air side 85 faces away from the first ply belt side 75. One or both of the first continuous ply web 60 and second continuous ply web 65 can be twisted 0 degrees, which could be twisted and untwisted by the same number of degrees, 180 degrees (for example right hand or left hand twist of 180 degrees, optionally in two 90 degree steps) or 360 degrees prior to bringing the first continuous ply web 60 and second continuous ply web 65 into facing relationship to obtain the desired positioning of the first ply belt side 75, first ply air said 90, second ply belt side 80, and second ply air side 85, relative to one another. It can be practical for the first ply air side 90 (or first continuous ply web air side) and second ply air side 85 (or second continuous ply web air side) to be in contact with one another and for the first ply belt side 75 (or first continuous ply web belt side) and second ply belt side 80 (or second continuous ply web belt side) to be facing away from one another with the first ply air side 90 and the second ply air side 85 (or second continuous ply web air side) between the first ply belt side 75 (or first continuous ply web belt side) and the second ply belt side 80 (or second continuous ply web belt side). Such an arrangement can position the belt side of the plies or continuous ply webs to face outwardly and ultimately form the exterior surface of the product 5 which can provide for a better tactile feel and or a surface upon which printing is convenient. Further, if multilayer plies or continuous ply webs are employed and particles are provided in one of the layers of the multilayer plies the belt side can act as a barrier to contain the particles and separate the consumer's hand from the particles.

If a step of the process further comprises a step of positioning the first ply belt side 75 and the second ply belt side 80 to face away from one another prior to joining the first ply 10 and the second ply 15, such step can occur by twisting one of the first continuous ply web 60 or second continuous ply web 65 180 degrees and placing the first continuous ply web 60 and second continuous ply web 65 in facing relationship with one another. The twisting of a continuous ply web can be performed by lifting the continuous ply web from the belt 50, twisting the continuous ply web 180 or 360 degrees, and placing the continuous ply web that was twisted to be in facing relationship with the other continuous ply web.

Twisting can be facilitated by lifting the continuous ply web with one or more, or a system of, turning bars 77. For instance, a turning bar 77 can be placed proximal the belt 50 and the continuous ply web can be fed around the turning bar 77 upwards. The continuous ply web can be twisted the desired amount and fed onto an elevated turning bar 77. The continuous ply web can be moved in the cross direction CD to be positioned above the other continuous ply web and fed over another turning bar 77. Then the continuous ply web can be fed downward and over another turning bar 77 proximal the belt 50 to be in facing relationship with the other continuous ply web. Other ways known in the art for flipping a continuous web can be employed, such as a contoured inverting surface.

The turning bars 77 may be static polished metal turning bars 77 or may be turning bars 77 that rotate about an axis driven by a motor or the drag force of the continuous ply web passing the turning bars 77, such as a roller. The turning bars 77 may be polished metal turning bars 77 to permit the continuous ply web to slide over the turning bars 77 with inconsequential drag force from the turning bars 77 so that the continuous ply web is not stretched more than is tolerable.

The first continuous ply web 10 can be considered to have a first ply belt side 75 and a first ply air side 90 opposite the first ply belt side 75. Similarly, the second continuous ply web 65 can be considered to have a second ply belt side 80 and a second ply air side 85 opposite the second ply belt side 80.

The belt side and air side of the plies can have a difference in surface texture. The belt side of a ply or continuous ply web is the side of the ply or continuous ply web that was formed in contact with the belt 50 upon which the fibrous elements 30 were deposited. That is, the belt side of a ply or continuous ply web can be the side of ply or continuous ply web facing and in contact with the belt 50 upon which fibrous elements 30 were deposited. The belt side can tend to have a flatter surface profile than the air side since the fibrous elements 30 may conform or partially conform to the surface 52 of the belt 50 on which the fibrous elements 30 land. The air side has no constraining surface. Absent post deposition processing, the air side of the plies may tend to be fluffier or loftier, possibly less coherent, than the belt side. Providing products 5 that have the belt sides of the plies facing outwardly can be practical for presenting the smoother surfaces of the plies outwardly for subsequent printing, better tactile feel and look, and better ability to contain particles. Also, if multilayer plies are provided, plies containing particles can confined to the interior of the product 5 so that the user does not have or has limited contact with the particles, which may comprise active agents.

Figure 6:
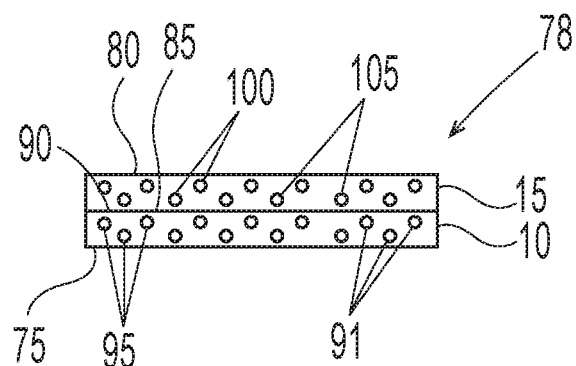
FIG. 6 is a cross section view of a two-ply product.

One or more of the plies may be provided with particles comprising one or more active agents, by way of nonlimiting example as shown in FIG. 6. For instance, the first ply 10 can be provided with a first plurality 91 of water soluble first particles 95. Similarly, the second ply 15 can be provided with a second plurality 100 of water soluble second particles 105. The first particles 95 can be compositionally the same as the second particles 105. This might be convenient if the second ply 15 is cut from the first ply 10, by way of nonlimiting example as shown in FIG. 5, without regard to the twisting and superposing steps downstream of knife 70.

Optionally, the outer surfaces of the product 5 can comprise the belt side surfaces of the plies. For instance, the first ply belt side 75 and the second ply belt side 80 can positioned to face away from one another prior to joining the first ply 10 and second ply 15. Described otherwise, the first ply air side 90 and the second ply air side 85 can face towards one another prior to joining the first ply 10 and second ply 15. Possible benefits to such a construction are discussed previously.

The process of manufacturing described herein may be conveniently employed fabricate products 5 having multiple plies and optionally multilayer plies. Multiple plies and multilayer plies enable the manufacturer to provide for different product benefits in each ply or layer, active agents away from the layers forming the outer surface of the products 5, surfaces that are convenient to print upon, and products 5 that are pleasant to touch.

Figure 7:
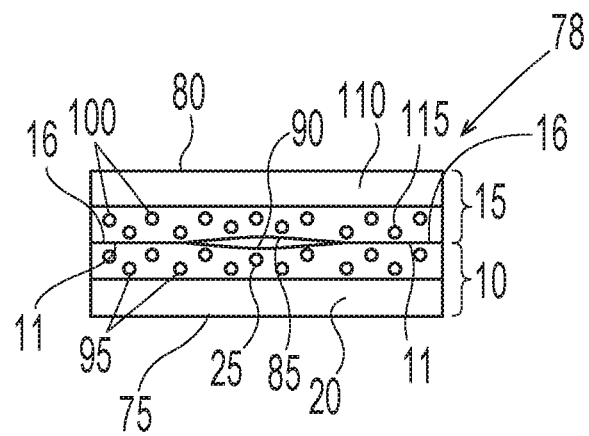
FIG. 7 is a cross section view of a two-ply product, each ply being a multilayer ply.

The process of manufacturing described herein can further comprise the steps of providing a fibrous first layer 20 and providing a fibrous second layer 25 facing, or in facing relationship with, the fibrous first layer 20. There can be intermingling of fibers constituting the first layer 10 and fibers constituting the second layer 25. As shown in FIG. 7, the first ply 10 can comprise a fibrous first layer 20 and a fibrous second layer 25. The first layer 20 and the second layer 25 can together form the first ply 10. The second layer 25 and the first layer 20 can be in facing and contacting relationship with one another, for instance as would occur if the second layer 25 is deposited on the first layer 20. The second layer 25 can comprise a first plurality 91 of water soluble first particles 95 distributed within the second layer 25. The process of manufacturing described herein can further comprise the steps of providing a fibrous third layer 110 and providing a fibrous fourth layer 115 facing, or in facing relationship with, the fibrous third layer. The third layer 110 and the fourth layer 115 can be in facing and contacting relationship with one another, for instance as would occur if the fourth layer 115 is deposited on the third layer 110.

The second ply 15 can comprise the fibrous third layer 110 and the fibrous fourth layer 115. The third layer 110 and the fourth layer 115 can together form the second ply 15. The fourth layer 115 can comprise a second plurality 100 of water soluble second particles 105 distributed within the fourth layer 115. Providing multilayer plies can tend to enhance the stiffness of the product 5. Further multilayer plies enable the product designer to place active agents in chosen layers of the plies, optionally provide for different active agents in different layers of the plies, and optionally place active agents between the layers and or plies.

Multilayer ply webs can be formed as illustrated in FIG. 3, by way of nonlimiting example. Each ply web can be formed independently of others by employing multiple die block assemblies 40. And optionally, first particles 95, second particles 105, and third particles can be introduced as described herein.

Each of the third layer 110 and the first layer 20 can have a basis weight from about 20 gsm to about 500 gsm, optionally about 40 gsm to about 100 gsm, optionally about 50 gsm to 80 gsm, according to the Basis Weight Test Method. Each of second layer 25 and the fourth layer 115 can have a basis weight from about 20 gsm to about 500 gsm, optionally about 40 gsm to about 300 gsm, optionally about 200 gsm, according to the Basis Weight Test Method.

Any embodiments contemplated herein, the first continuous ply web 60, second continuous ply web 65, and third continuous ply web 130 (if present) can have a basis weight from about 100 gsm to about 800 gsm, optionally from about 150 gsm to about 500 gsm, optionally about 200 gsm to about 300 gsm, according to the Basis Weight Test Method.

To provide for products 5 having surfaces that are easy to print upon and are pleasant to touch, it can be practical to have the belt facing surfaces of the plies forming the outer surface of the product 5. As shown in FIG. 7, the first layer 20 can be oriented towards a first ply belt side 75 and the second layer 25 can be oriented towards a first ply air side 90. The first ply air side 90 can be opposite the first ply belt side 75. The third layer 110 can be oriented towards the second ply belt side 80 and the fourth layer 115 can be oriented towards a second ply air side 85. The second ply air side 85 can be opposite the second ply belt side 80. The process of manufacturing the product 5 can comprise the further step of positioning the first ply belt side 75 and the second ply belt side 80 to face away from one another prior to joining the first ply 10 and the second ply 15. This arrangement can provide a benefit of positioning the first particles 95 and second particles 105 towards the interior of the product 5 and remote from being in contact with the consumer's hand as the product is handled. In this arrangement, the second layer 25 and the fourth layer 115 can be between the first layer 20 and the third layer 110.

It can be practical to provide the first layer 20 to have fewer first particles 95 than the second layer 25 and a further the fifth layer if present. The first layer 20 can be free of or substantially free of first particles 95. Optionally the second layer 25 can be free of or substantially free of second particles 105. Similarly, the fifth layer, if present, can be free of or substantially free of third particles. Such an arrangement can be practical for minimizing consumer exposure to the active agents in particles and or active agents that are in the fibrous elements 30 forming the second layer 25 and or fourth layer 115 or any other layer that is interior to layers forming the surface of the product 5.

Figure 8:
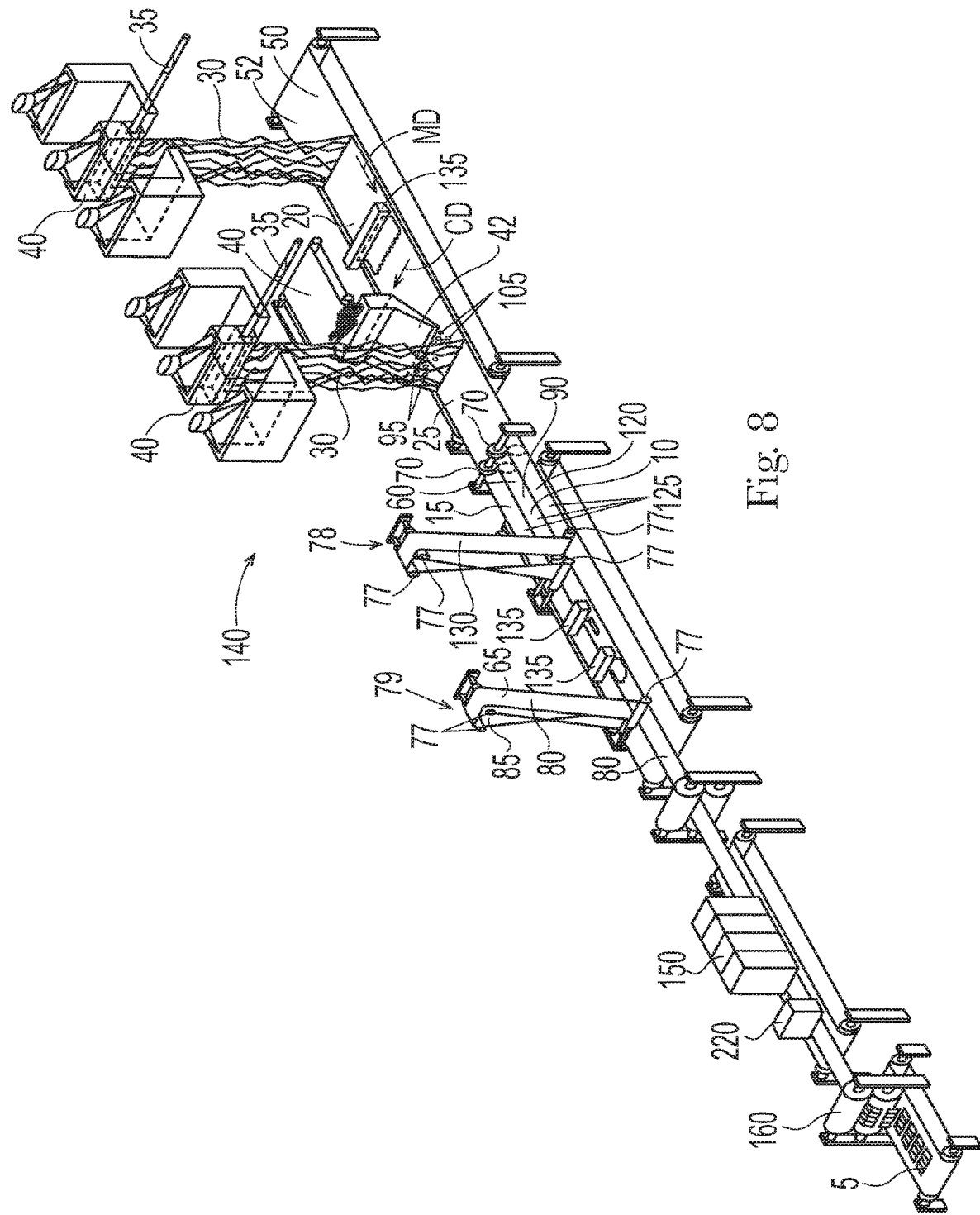
FIG. 8 is manufacturing line for making a three-ply product.

A three-ply product 5 can also be practical. A nonlimiting example of the process to make a three-ply product 5 is shown in FIG. 8. To make a three-ply product 5, the process further comprises the step of providing a water soluble fibrous third ply 120. The third ply 120 can be separate from the first ply 10 and second ply 15. The first ply 10, second ply 15, and third ply 120 can be superposed with one another so that the third ply 120 is between the first ply 10 and second ply 15. The first ply 10, second ply 15, and third ply 120 can be joined to form the water soluble product 5.

The third ply 120 can be provided as part of a third continuous ply web 130. Conveniently, the third continuous ply web 130 can be cut in the machine direction (MD) from the first continuous ply web 60. For instance, a first continuous ply web 60 can be provided by depositing fibrous elements 30 onto a belt 50. Optionally, particles can be introduced into the stream of fibrous elements 30 between the die block assembly 40 and the belt 50. Further optionally, particles can be introduced onto the air side of the first continuous ply web 60. The second continuous ply web 65 and the third continuous ply web 130 can be cut from the first continuous ply web 60. A third continuous ply web 130 is considered to be cut in the machine direction MD from the first continuous ply web 60 if it is cut in the machine direction MD from the second continuous ply web 65 after the second continuous ply web 65 is cut in the machine direction MD from the first continuous ply web 60.

In one configuration of the process, three lanes 125 of separate continuous ply webs can be provided in the machine direction MD. The lanes of continuous ply webs may be in any order in the cross direction and web handling appurtenances may be used to lift individual continuous ply webs from the belt 50 and lay them onto another continuous ply web with either the belt side or air side facing up. Starting with a single continuous ply web such as the first continuous ply web 60 and cutting from that ply web the second continuous ply web 65 and third continuous ply web 130 can simplify manufacturing quality control since only a single die block assembly 40 and optionally a particle providing apparatus need to be monitored and controlled. Optionally, each of the continuous ply webs can be formed by one or more separate die block assemblies 40.

After superposing the first continuous ply web 60, second continuous ply web 65, and third continuous ply web 130, such continuous ply webs can be cut to form the water soluble product 5. Optionally, two or more of such continuous ply webs can first be joined to one another and then cut to form the water soluble product 5. Optionally, the step of joining two or more of the continuous ply webs and cutting such webs to form the water soluble product 5 can be combined in a single step. Further optionally, such continuous ply webs can be cut to provide the first ply 10, second ply 15, and third ply 120, before joining two or more of such plies to form the water soluble product 5.

Like the two ply water soluble product 5 discussed above and for the same reasons as discussed above, when a third ply 120 is positioned between the first ply 10 and second ply 15 it can be practical for the process to further comprise the step of positioning the first ply belt side 75 and the second ply belt side 80 to face away from one another prior to joining portions of the first ply 10 and second ply 15.

The process can further comprise the step of placing on or in one or more of the first ply 10, second ply 15, and third ply 120, and any layer of such ply (e.g. first layer 20, second layer 25, third layer 110, fourth layer 115, or any layer constituting the third ply 120) on either or both the air side or belt side of such ply or continuous ply web an active agent selected from the group consisting of unencapsulated or encapsulate perfume, surfactant, enzyme, bleach, chelant, structurant, builder, organic polymeric compound, brightener, hueing agent, suds suppressor, conditioning agent, humectant, alkalinity system, pH control system, buffer alkanolamine, insect repellant, hair care agent, hair conditioning agent, skin care agent, sunscreen agent, skin conditioning agent, fabric softener, anti-wrinkling agent, antistatic agent, fabric care stain removal agent, soil release agent, dispersing agent, suds suppressing agent, suds boosting agent, anti-foam agent, fabric refreshing agent, dishwashing agent, hard surface care agent, antimicrobial agent, antibacterial agent, antifungal agent, bleach activating agent, chelating agent, builder, lotion, air care agent, carpet care agent, dye transfer-inhibiting agent, clay soil removing agent, anti-redeposition agent, polymeric soil release agent, polymeric dispersing agent, alkoxylated polyamine polymer, alkoxylated polycarboxylate polymer, amphilic graft copolymer, dissolution aid, buffering system, water-softening agent, water-hardening agent, pH adjusting agent, flocculating agent, effervescent agent, preservative, cosmetic agent, make-up removal agent, lathering agent, deposition aid agent, coacervate-forming agent, clay, thickening agent, latex, silica, drying agent, odor control agent, antiperspirant agent, cooling agent, warming agent, absorbent gel agent, anti-inflammatory agent, dye, pigment, acid, base, liquid treatment active agent, agricultural active agent, industrial active agent, ingestible active agent, medicinal agent, teeth whitening agent, tooth care agent, mouthwash agent, periodontal gum care agent, dietary agent, vitamin, minerals, water-treatment agent, water clarifying agent, water disinfecting agent, and mixtures thereof. The active agent may be provided as particles introduced into the stream for fibrous elements 30 discharged from any of the die block assemblies 40. The active agent may end up being positioned between plies of the product 5, embedded in one or more of the plies forming the product 5, or partially embedded in one or more of the plies forming the product 5.

The fibrous water-soluble unit dose articles disclosed herein may comprise several active agents. Preferably, the fibrous water-soluble unit dose article disclosed herein comprises a perfume, where the perfume is positioned between plies of the article 5, embedded in one or more of the plies forming the product 5, or partially embedded in one or more of the plies forming the product 5. More preferably, the fibrous water-soluble unit dose article disclosed herein comprises a concentrated enzyme composition, as described below, which is positioned between plies of the article 5, embedded in one or more of the plies forming the product 5, or partially embedded in one or more of the plies forming the product 5.

During the process of manufacturing a product 5, the concentrated enzyme composition may be deposited by an active agent applicator 135 on the upper facing surface 600 of any ply or in any ply, or on and in any ply, or on the air side 72 of any continuous ply web, or in any continuous ply web by an active agent applicator 135. One or more active agent applicators 135 can be provided on the manufacturing line 140. An active agent applicator 135 can be a nozzle, extruder, sifter, printer, transfer roll, air atomized spray nozzle, hydraulically atomized spray nozzle, fluid applicator, extrusion applicator, hotmelt applicator, ink jet, flexographic printer, gravure printer, offset gravure, drop on demand ink jet, or any other device suitable for depositing an active agent onto a ply, especially a moving ply. Active agent applicators 135 can be positioned over any over any lane or any of the plies.

For reasons of practicality, active agents, such as a concentrated enzyme composition, may be placed on or in or on and in the upwards facing side of any continuous ply web after the continuous ply web is positioned to have the desired side facing up. If an active agent is applied on or in or on and in a continuous ply web before the continuous ply web is finally placed in its vertical position of the product 5, the active agent might contact the turning bars 77. That could result poor web handling if active agent residue accumulates on the turning bars 77. For instance, as shown in FIG. 8, the active agent applicator 135 places active agent on the third continuous ply web 130 after the third continuous ply web 130 is positioned on top of the first continuous ply web 60. After the active agent is placed on the third continuous ply web 130, the second continuous ply web 65 can be place on top of the third continuous ply web 130 so that the third continuous ply web 130 is between the first continuous ply web 60 and the second continuous ply web 65.

Optionally, an active agent, such as a concentrated enzyme composition, may be placed on or in the first ply air side 90, i.e. the upwards facing surface of the first continuous ply web 60 before the third continuous ply web 130 is positioned on top of the first continuous ply web 60. As such, when a three ply product 5 is employed, active agent can be conveniently provided above or below the third ply 120, on or in the upper facing surface of either side of the third ply 120, or on or in an inwardly oriented side of the first ply 10 or second ply 10. So, for three ply product 5, multiple incompatible active agents can be conveniently separated from one another by the third ply 120.

The process can further comprise the step of providing a solution of filament-forming composition 35. The filament-forming composition 35 can be passed through one or more die block assemblies 40 comprising a plurality of spinnerets 45 to form a plurality of fibrous elements 30. The plurality of fibrous elements 30 can be deposited onto a belt 50 moving in a machine direction MD to form the first ply 10. The first ply 10 or first continuous ply web 60 can be cut in the machine direction to form the second ply 15, second continuous ply web 65, third ply 120, and or third continuous ply web 130, as described previously. Optionally, multiple filament-forming compositions may be supplied to a single die block assembly 40 or portions thereof or multiple filament-forming compositions may be supplied to multiple die block assemblies 40.

The first particles 95 and second particles 105 can be introduced into the stream of fibrous elements 30 before the fibrous elements 30 are deposited onto a belt 50.

The process illustrated in FIG. 8 can be used to manufacture three ply water soluble products 5 in a continuous process. The continuous process can be uninterrupted from the step of providing the filament forming composition 35 to formation of the water soluble products 5, whether the water soluble products 5 exist as part of a web of a plurality of water soluble products joined to one another or are discrete water soluble products separated from one another. A benefit of a continuous process is that the ply or continuous ply webs do not need to be stored before converting such materials into water soluble products. Storage of plies or continuous ply webs that are water soluble can require undue attention to temperature, humidity, and gentle handling to preserve the integrity of such materials. By continuous process, it is meant that the steps of the process occur in on a continuous manufacturing line.

At the upstream end of the process, a filament forming composition 35 can be provided. The filament forming composition can passed through a die block assembly 40 comprising a plurality of spinnerets 45 to form a plurality of fibrous elements 30. The fibrous elements 30 can be deposited on a belt 50 moving in a machine direction to form a first layer 20. The first layer 20 can then pass beneath another die block assembly 40 from which a filament forming composition 35 is exiting through a plurality of spinnerets 45 to form a plurality of fibrous elements 30. Particles can be inserted into the stream of fibrous elements 30. The fibrous elements 30 and particles can be laid on top of the first layer 20 in a second layer 25. Together, the first layer 20 and second layer 25 can form the first ply 10 which can be part of the first continuous ply web 60.

The first ply 10 can be cut in the machine direction MD into three lanes 125 of plies. The center lane can be the first continuous ply web 60. The outer lanes 125 can be the second continuous ply web 65 and third continuous ply web 130, of which the second ply 15 and third ply 120 can be part of, respectively. One or more active agent applicators 135 can apply one or more active agents to the second layer 25.

An optional third ply 120 as part of a third continuous ply web 130 can be lifted from the belt 50 and placed onto the first ply 10 that can be part of a first continuous ply web 60. Optionally, the third ply 120 or third continuous ply web 130 can be inverted before placement upon the first ply 10 or first continuous ply web 60. Optionally, one or more active agent applicators 135 can apply one or more active agents to the air side of third ply 120 or third continuous ply web 130.

A second ply 15 as part of a second continuous ply web 65 can be lifted from the belt 50 and placed on top of the third ply 120 or third continuous ply web 130, if present, or in the absence thereof, on top of the first ply 10 or first continuous ply web 60. Optionally, the second ply 15 or second continuous ply web 65 can be inverted before placement upon the third ply 120 or third continuous ply web 130, if present, or in the absence thereof, on top of the first ply 10 or first continuous ply web 60.

As shown in FIG. 8, the turning bars 77 can be provided at a first web handling station 78 and a second web handling station 79. The first web handling station 78 can be downstream of the die block assembly 40 and upstream of the second web handling station 79. The active agent applicator or applicators 135 can be positioned upstream of the first web handling station 78 and or between the first web handling station 78 and the second web handling station 79. The active agent applicator 135 can be positioned upstream of the first web handling station 79 and positioned to overlie the first continuous ply web 60. Optionally, the active agent applicator 135 can be positioned between the first web handling station 78 and the second web handling station 79 so that it overlies the third continuous ply web 130, the first continuous ply web 60 incidentally being beneath the third continuous ply web 130. Positioning the active applicator or applicators 135 as such permits the active agent to be positioned towards the interior of the finished product 5, reducing the potential for the consumer to contact the active agent.

The water soluble products 5 can be printed upon by one or more printing units 150. A printing unit 150 can be positioned anywhere on the manufacturing line so that the desired surface of one or more of the first ply 10, second ply 15, and or third ply 120 can be printed upon. The printing can be CMYK printing. The printing can be laser jet, ink jet, gravure, pad, rotogravure, flexographic, offset, screen, lithographic, or any other printing approach suitable for printing webs of material, particularly process that are best suited for nonwoven materials. A drier 220 can be located downstream or upstream of the printing unit 150.

The first ply 10 and second ply 15, or a first portion 11 of the first ply 10 and a second portion 16 of a second ply 15, can be joined to one another, for instance by using a bonding roll, to form the water soluble product 5. If there is a third ply 120 between the first ply 10 and the second ply 15, the third ply 120 can be contained within the first ply 10 and second ply 15. Optionally, the first ply 10 and second ply 15 can be joined to the third ply 120 so that the first ply 10 and second ply 15 are joined to one another through the third ply 120.

Plies can be bonded to one another by thermal bonding. Thermal bonding can be practical if the plies contain thermoplastic powder, optionally water soluble thermoplastic material. Thermal bonding can also be practical if the fibers constituting the plies are thermoplastic. Plies can optionally be calendar bonded, point bonded, ultrasonically bonded, infrared bonded, through air bonded, needle punched, hydroentangled, melt bonded, adhesive bonded, or other known technical approach for bonding plies of material.

The water soluble products 5 can be separated from one another by a die cutter 160, optionally a rotary die cutter 160. A rotary die cutter 160 comprises a die roll and an anvil roll, the die roll and anvil rotating counter to one another. The plies can be bonded to one another and die cut in a single step using a single reciprocating bonding and die cutting apparatus or a rotary bonding and die cutting apparatus. In a rotary bonding and die cutting apparatus that combines the bonding and die cutting, the die is shaped to provide a die cut in which the material being cut is pinched between the knife-edge of the die and the smooth surface of the anvil. Further the die is shaped to compress portions of the plies, or continuous ply webs, and layers thereof together to bond the plies, continuous ply webs, and layers thereof to one another. The die can be a patterned die that provides a cutting and bonding pattern to the plies, continuous ply webs, and layers thereof. Optionally, the die can be heated, which might be practical for thermal bonding of the plies, continuous ply webs, and layers thereof.

Figure 9:
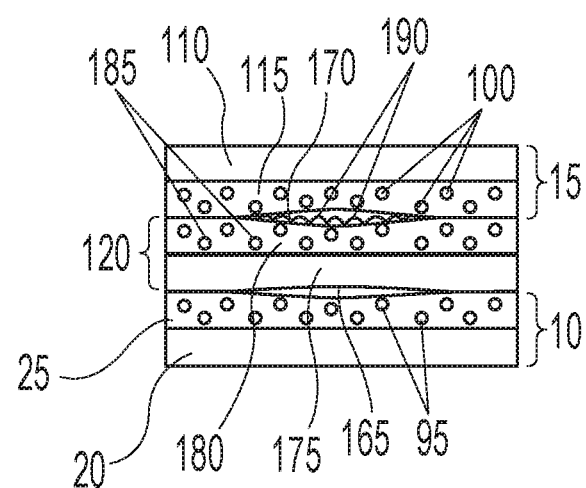
FIG. 9 is a cross section view of a three-ply product, each ply being a multilayer ply.

A three ply water soluble product 5 is shown in FIG. 9. Each of the plies can be a multi-layer ply.

There can be intermingling of fibers of one layer with fibers of another layer next thereto. There can also be intermingling of fibers of one ply with fibers of another layer or ply next thereto. As shown in FIG. 9, the third ply 120 can be between the first ply 10 and second ply 15. The third ply 120 can be a single layer ply or a multi-layer ply. The third ply 120 can have a third ply belt side 165 and third ply air side 170 opposite the third ply belt side 165. The third ply 120 can comprise a fibrous fifth layer 175 and a fibrous sixth layer 180. The fifth layer 175 and the sixth layer 180 together forming the third ply 120. Optionally, the third ply 120 can comprise a plurality of third particles 185. Further optionally, the sixth layer 180 can comprise third particles 185. One or more active agents 190 can be between the third ply 120 and the second ply 15. The third ply 120 can optionally be flipped relative to that shown in FIG. 9 with sixth layer 165 oriented towards the second layer 25. Likewise, the plies can be arranged in any desired order in any desired orientation.

There can be any integer number greater than or equal to two of plies in a product 5. That may be accomplished by providing such number of plies or continuous ply webs and stacking such plies or continuous ply webs, inverting any of the plies or continuous ply webs as desired, and assembling such plies or continuous ply webs to for such products 5.

Concentrated Enzyme Composition

The fibrous water-soluble unit dose articles may comprise a concentrated enzyme composition. The articles may comprise from about 0.1% to about 5%, preferably from about 0.5% to about 3%, more preferably from about 1% to about 2.5% by weight of the article of enzyme composition.

A concentrated enzyme composition may optionally comprise a water-binding agent. Suitable water-binding agents include glycerin, propylene glycol, glycerol, PPG, polyethylene glycol, carboxymethylcellulose, isosorbide, and mixtures thereof. The water-binding agent may reduce the water activity $a_w$ of the enzyme composition. It is believed that an enzyme composition having a reduced water activity may be applied to a fibrous ply, without leaking through, deforming, and/or dissolving the fibrous ply.

The concentrated enzyme composition may have a shear viscosity of from about 4 Pa-s to about 200 Pa-s, preferably from about 10 Pa-s to about 150 Pa-s, more preferably from about 50 Pa-s to about 100 Pa-s when measured at 1 $s^{-1}$ at 20° C. as determined according to the Shear Viscosity Test Method described herein.

The concentrated enzyme composition may have a shear viscosity of from about 1 Pa-s to about 25 Pa-s, preferably from about 1 Pa-s to about 20 Pa-s, more preferably from about 1 Pa-s to about 15 Pa-s when measured at 10 $s^{-1}$ at 20° C. as determined according to the Shear Viscosity Test Method described herein.

It has been found that concentrated enzyme compositions having the viscosity ranges of the present disclosure may be able to be pumped efficiently when applying the composition to a fibrous ply, while also being viscous enough to not leak through, deform, or dissolve the fibrous ply. Further, concentrated enzyme compositions having the viscosity ranges of the present disclosure may be less likely to migrate within the article. The concentrated enzyme composition may be located on, or applied to, at least one ply. The concentrated enzyme composition and its components are further described herein.

Enzymes in Concentrated Enzyme Compositions

The concentrated enzyme composition may comprise one or more enzymes. Often, enzymes are in the form of enzymes slurries. The slurries include a water component and a solvent component, along with the enzymes. Slurries may also include other miscellaneous components. In a non-limiting example, an enzyme slurry may have from about 1% to about 99%, by weight of the slurry, of water and from about 1% to about 99% by weight of the slurry, of enzyme. Without wishing to be bound by theory, when the water-binding agent is added to the enzyme slurry, the agent may bind with the unbound water to lower the water activity level, resulting in a composition having less unbound water. Less unbound water may result in less of the water-soluble fibrous structure deforming and/or dissolving. The concentrated enzyme composition may comprise from about 1% to about 95%, preferably from about 5% to about 85%, more preferably from about 10% to about 75% by weight of the composition, of water.

The concentrated enzyme composition may comprise an enzyme. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, proteases, and amylases, or mixtures thereof. In a non-limiting example, the concentrated enzyme composition may comprise an enzyme wherein the enzyme is selected from the group consisting of: lipase, amylase, protease, mannanase, pectinase, and mixtures thereof. A typical combination is an enzyme cocktail that may comprise, for example, a protease and lipase in conjunction with amylase.

Proteases

Preferably the concentrated enzyme composition comprises one or more proteases. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii* described in U.S. Pat. No. 6,312,936 B1, U.S. Pat. Nos. 5,679,630, 4,760,025, 7,262,042 and WO09/021867.

(b) trypsin-type or chymotrypsin-type proteases, such as trypsin (e.g., of porcine or bovine origin), including the *Fusarium* protease described in WO 89/06270 and the chymotrypsin proteases derived from Cellumonas described in WO 05/052161 and WO 05/052146.

(c) metalloproteases, including those derived from *Bacillus amyloliquefaciens* described in WO 07/044993A2.

Preferred proteases include those derived from *Bacillus gibsonii* or *Bacillus Lentus*. Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

Amylases

Preferably the concentrated enzyme composition may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334).

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, Calif.) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

Liases

Preferably the invention comprises one or more lipases, including "first cycle lipases" such as those described in U.S. Pat. No. 6,939,702 B1 and US PA 2009/0217464. Preferred lipases are first-wash lipases. In one embodiment of the invention the composition comprises a first wash lipase. First wash lipases includes a lipase which is a polypeptide having an amino acid sequence which: (a) has at least 90% identity with the wild-type lipase derived from *Humicola lanuginosa* strain DSM 4109; (b) compared to said wild-type lipase, comprises a substitution of an electrically neutral or negatively charged amino acid at the surface of the three-dimensional structure within 15A of E1 or Q249 with a positively charged amino acid; and (c) comprises a peptide addition at the C-terminal; and/or (d) comprises a peptide addition at the N-terminal and/or (e) meets the following limitations: i) comprises a negative amino acid in position E210 of said wild-type lipase; ii) comprises a negatively charged amino acid in the region corresponding to positions 90-101 of said wild-type lipase; and iii) comprises a neutral or negative amino acid at a position corresponding to N94 or said wild-type lipase and/or has a negative or neutral net electric charge in the region corresponding to positions 90-101 of said wild-type lipase. Preferred arevariants of the wild-type lipase from *Thermomyces lanuginosus* comprising one or more of the T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Preferred lipases would include those sold under the tradenames Lipex® and Lipolex® and Lipoclean®.

Endoglucanases

Other preferred enzymes include microbial-derived endoglucanases exhibiting endo-beta-1,4-glucanase activity (E.C. 3.2.1.4), including a bacterial polypeptide endogenous to a member of the genus *Bacillus* which has a sequence of at least 90%, 94%, 97% and even 99% identity to the amino acid sequence SEQ ID NO:2 in U.S. Pat. No. 7,141,403B2) and mixtures thereof. Suitable endoglucanases are sold under the tradenames Celluclean® and Whitezyme® (Novozymes A/S, Bagsvaerd, Denmark).

Pectate Lyases

Other preferred enzymes include pectate lyases sold under the tradenames Pectawash®, Pectaway®, Xpect® and mannanases sold under the tradenames Mannaway® (all available from Novozymes A/S, Bagsvaerd, Denmark), and Purabrite® (Genencor International Inc., Palo Alto, Calif.).

Nuclease Enzyme

The concentrated enzyme composition may comprise a nuclease enzyme. The nuclease enzyme is an enzyme capable of cleaving the phosphodiester bonds between the nucleotide sub-units of nucleic acids. The nuclease enzyme herein is preferably a deoxyribonuclease or ribonuclease enzyme or a functional fragment thereof. By functional fragment or part is meant the portion of the nuclease enzyme that catalyzes the cleavage of phosphodiester linkages in the DNA backbone and so is a region of said nuclease protein that retains catalytic activity. Thus it includes truncated, but functional versions, of the enzyme and/or variants and/or derivatives and/or homologues whose functionality is maintained.

Preferably the nuclease enzyme is a deoxyribonuclease, preferably selected from any of the classes E.C. 3.1.21.x, where x=1, 2, 3, 4, 5, 6, 7, 8 or 9, E.C. 3.1.22.y where y=1, 2, 4 or 5, E.C. 3.1.30.z where z=1 or 2, E.C. 3.1.31.1 and mixtures thereof.

The concentrated enzyme composition may comprise less than about 50%, preferably less than about 40%, more preferably less than about 20%, by weight of the composition, of solvent.

A benefit of creating concentrated enzyme compositions of the present disclosure rather than simply removing water from the enzyme slurry is that the semi-solid state of the concentrated enzyme composition is easier to handle in terms of transporting the composition throughout the process of making and applying to the fibrous structure. As enzyme are small and lightweight, when water is simply removed from enzyme slurries, the enzymes may be difficult to control when transporting the enzymes during the process of making and applying to the fibrous structure. Dry enzymes may more readily move into the atmosphere and pose an inhalation risk to humans.

Water-Binding Agent

The concentrated enzyme composition may comprise a water-binding agent. The concentrated enzyme composition may comprise a water-binding agent selected from the group consisting of: glycerin, propylene glycol, glycerol, PPG, polyethylene glycol, carboxymethylcellulose, isosorbide, and mixtures thereof.

Without wishing to be bound by theory, it has been found that the incorporation of water-binding agent of a water-binding agent in the concentrated enzyme composition may result in favorable ranges of viscosity and favorable ranges of water activity. When favorable ranges of viscosity and water activity are reached, the concentrated enzyme composition may be in a semi-solid state that can be pumped through the machinery and applied to the fibrous structure without leaking through, deforming, and/or dissolving the fibrous structure.

Suitable water-binding agents are those that when added to the enzyme slurry, effectively increase the viscosity to the ranges of the present disclosure, lower the water activity to the ranges of the present disclosure, and provide stable, homogenous compositions. Water-binding agents for use in the concentrated enzyme composition are carefully selected based on criteria including, but not limited to, the agent's chemical structure such as the number of hydroxyl groups and the agent's weight average molecular weight.

Without wishing to be bound by theory, water-binding agents that are lower in molecular weight are able to more effectively lower water activity than their higher molecular weight counterparts, however, lower molecular weight water-binding agents may result in concentrated compositions that are of too low viscosity and can more readily leak through a fibrous structure. Water-binding agents that are higher in molecular weight are able to more effectively increase the viscosity of the concentrated composition than their lower molecular weight counterparts, however, higher molecular weight water-binding agents are less effective at lowering water activity.

Viscosity and Water Activity

Without wishing to be bound by theory, it has been found that concentrated enzyme compositions having the viscosity ranges of the present disclosure may be able to be pumped efficiently when applying the composition to the fibrous structure while also being viscous enough to not leak through the fibrous structure. Without wishing to be bound by theory, it has been found that concentrated enzyme compositions having the water activity ranges of the present disclosure may be able to be effectively applied to the fibrous structure without leaking through, deforming, or dissolving the fibrous structure. Without wishing to be bound by theory, it is surmised that the addition of the water-binding agent to the enzyme slurry results in concentrated enzyme compositions wherein the total amount of water that is left unbound by the water-binding agent is insufficient to cause the concentrated enzyme composition to leak through, dissolve, and/or deform the fibrous structure. Further, it has been found that having the viscosity ranges and water activity ranges of the present disclosure may be particularly useful in keeping the concentrated enzyme composition from migrating within the fibrous structure. The concentrated enzyme composition of the present disclosure may be incorporated into a fibrous structure without the problem of migration, such as what occurs within film-based unit dose articles. Migration can become an issue when two or more active agents are incompatible with one another, causing some loss in one or more of the active agents. When the concentrated enzyme composition is the viscosity ranges and water activity ranges of the present disclosure, the concentrated enzyme composition will be in a semi-solid to solid state. In such a state, the concentrated enzyme composition may be applied onto a fibrous structure and will be less likely to migrate throughout the fibrous structure. This is especially beneficial as certain other active agents may lower enzyme activity when in direct contact with the enzyme.

The concentrated enzyme composition may have a shear viscosity of from about 4 Pa-s to about 200 Pa-s when measured at $1\ s^{-1}$ at 20° C. according to the Shear Viscosity Test Method described herein.

The concentrated enzyme composition may have a water activity of less than about 0.9, preferably less than about 0.8, more preferably less than about 0.7 as determined according to the Water Activity Test Method described herein.

Active Agents

The fibrous water-soluble unit dose article may comprise one or more active agents other than perfume. The active agents may be present in the fibrous elements, in the particles, or as a concentrated composition or slurry in the article.

One or more active agents may be released from the fibrous element and/or particle and/or fibrous structure when the fibrous element and/or particle and/or fibrous structure is exposed to a triggering condition. The active agents may be released from the fibrous element and or fibrous structure or part thereof loses its physical structure (e.g. dissolves, melts), alters its physical structure (e.g swells, shrinks, lengthens, shortens). The active agents may be released may be released when the fibrous structure or part thereof changes in morphology.

The fibrous element and/or particle and/or fibrous structure may release an active agent upon the fibrous element and/or particle and/or fibrous structure being exposed to a triggering condition that results in the release of the active agent, such as by causing the fibrous element and/or particle and/or fibrous structure to lose or alter its identity as discussed above. Non-limiting examples of triggering conditions include exposing the fibrous element and/or particle and/or fibrous structure to solvent, a polar solvent, such as alcohol and/or water, and/or a non-polar solvent, which may be sequential, depending upon whether the filament-forming material comprises a polar solvent-soluble material and/or a non-polar solvent-soluble material; forming a wash liquor by contacting the fibrous structure product with water.

The active agent may be selected from the group consisting of a surfactant, a structurant, a builder, a polymeric dispersing agent, an enzyme, an enzyme stabilizer, a bleach system, a brightener, a hueing agent, a chelating agent, a suds suppressor, a conditioning agent, a humectant, a perfume, a perfume microcapsule, a filler or carrier, an alkalinity system, a pH control system, a buffer, an alkanolamine, mosquito repellant, and mixtures thereof.

Surfactant

The surfactant may be selected from the group consisting of anionic surfactants, nonionic surfactants, cationic surfactants, zwitterionic surfactants, amphoteric surfactants, ampholytic surfactants, and mixtures thereof.

Anionic Surfactant

Suitable anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Anionic surfactants may be supplemented with salt as a means to regulate phase behavior; suitable salts may be selected from the group consisting of sodium sulfate, magnesium sulfate, sodium carbonate, sodium citrate, sodium silicate, and mixtures thereof.

Non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. Suitable anionic surfactants may be derived from renewable resources, waste, petroleum, or mixtures thereof. Suitable anionic surfactants may be linear, partially branched, branched, or mixtures thereof Alkoxylated alkyl sulfate materials comprise ethoxylated alkyl sulfate surfactants, also known as alkyl ether sulfates or alkyl polyethoxylate sulfates. Examples of ethoxylated alkyl sulfates include water-soluble salts, particularly the alkali metal, ammonium and alkylolammonium salts, of organic sulfuric reaction products having in their molecular structure an alkyl group containing from about 8 to about 30 carbon atoms and a sulfonic acid and its salts. (Included in the term "alkyl" is the alkyl portion of acyl groups. In some examples, the alkyl group contains from about 15 carbon atoms to about 30 carbon atoms. In other examples, the alkyl ether sulfate surfactant may be a mixture of alkyl ether sulfates, said mixture having an average (arithmetic mean) carbon chain length within the range of about 12 to 30 carbon atoms, and in some examples an average carbon chain length of about 12 to 15 carbon atoms, and an average (arithmetic mean) degree of ethoxylation of from about 1 mol to 4 mols of ethylene oxide, and in some examples an average (arithmetic mean) degree of ethoxylation of 1.8 mols of ethylene oxide. In further examples, the alkyl ether sulfate surfactant may have a carbon chain length between about 10 carbon atoms to about 18 carbon atoms, and a degree of ethoxylation of from about 1 to about 6 mols of ethylene oxide. In yet further examples, the alkyl ether sulfate surfactant may contain a peaked ethoxylate distribution.

Non-alkoxylated alkyl sulfates may also be added to the disclosed detergent compositions and used as an anionic surfactant component. Examples of non-alkoxylated, e.g., non-ethoxylated, alkyl sulfate surfactants include those produced by the sulfation of higher $C_8$-$C_{20}$ fatty alcohols. In some examples, primary alkyl sulfate surfactants have the general formula: $ROSO_3^-M^+$, wherein R is typically a linear $C_8$-$C_{20}$ hydrocarbyl group, which may be straight chain or branched chain, and M is a water-solubilizing cation. In some examples, R is a $C_{10}$-$C_{18}$ alkyl, and M is an alkali metal. In other examples, R is a $C_{12}/C_{14}$ alkyl and M is sodium, such as those derived from natural alcohols.

Other useful anionic surfactants can include the alkali metal salts of alkyl benzene sulfonates, in which the alkyl group contains from about 9 to about 15 carbon atoms, in straight chain (linear) or branched chain configuration. In some examples, the alkyl group is linear. Such linear alkylbenzene sulfonates are known as "LAS." In other examples, the linear alkylbenzene sulfonate may have an average number of carbon atoms in the alkyl group of from about 11 to 14. In a specific example, the linear straight chain alkyl benzene sulfonates may have an average number of carbon atoms in the alkyl group of about 11.8 carbon atoms, which may be abbreviated as C11.8 LAS.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

Another example of a suitable alkyl benzene sulfonate is a modified LAS (MLAS), which is a positional isomer that contains a branch, e.g., a methyl branch, where the aromatic ring is attached to the 2 or 3 position of the alkyl chain.

The anionic surfactant may include a 2-alkyl branched primary alkyl sulfates have 100% branching at the C2 position (C1 is the carbon atom covalently attached to the alkoxylated sulfate moiety). 2-alkyl branched alkyl sulfates and 2-alkyl branched alkyl alkoxy sulfates are generally derived from 2-alkyl branched alcohols (as hydrophobes). 2-alkyl branched alcohols, e.g., 2-alkyl-1-alkanols or 2-alkyl primary alcohols, which are derived from the oxo process, are commercially available from Sasol, e.g., LIAL®, ISALCHEM® (which is prepared from LIAL® alcohols by a fractionation process). C14/C15 branched primary alkyl sulfate are also commercially available, e.g., namely LIAL® 145 sulfate.

The anionic surfactant may include a mid-chain branched anionic surfactant, e.g., a mid-chain branched anionic detersive surfactant, such as, a mid-chain branched alkyl sulphate and/or a mid-chain branched alkyl benzene sulphonate.

Additional suitable anionic surfactants include methyl ester sulfonates, paraffin sulfonates, α-olefin sulfonates, and internal olefin sulfonates.

Nonionic Surfactant

Suitable nonionic surfactants include alkoxylated fatty alcohols. The nonionic surfactant may be selected from ethoxylated alcohols and ethoxylated alkyl phenols of the formula $R(OC_2H_4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15.

Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA; $C_{14}$-$C_{22}$ mid-chain branched alkyl alkoxylates, $BAE_x$, wherein x is from 1 to 30; alkylpolysaccharides; specifically alkylpolyglycosides; polyhydroxy fatty acid amides; and ether capped poly(oxyalkylated) alcohol surfactants.

Suitable nonionic detersive surfactants also include alkyl polyglucoside and alkyl alkoxylated alcohol. Suitable nonionic surfactants also include those sold under the tradename Lutensol® from BASF.

Cationic Surfactant

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, e.g., amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulphate; and sulphonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Zwitterionic Surfactant

Suitable zwitterionic surfactants include: derivatives of secondary and tertiary amines, derivatives of heterocyclic secondary and tertiary amines, or derivatives of quaternary ammonium, quaternary phosphonium or tertiary sulfonium compounds. Suitable examples of zwitterionic surfactants include betaines, including alkyl dimethyl betaine and cocodimethyl amidopropyl betaine, $C_8$ to $C_{18}$ (for example from $C_{12}$ to $C_{18}$) amine oxides, and sulfo and hydroxy betaines, such as N-alkyl-N,N-dimethylammino-1-propane sulfonate where the alkyl group can be $C_8$ to $C_{18}$.

Amphoteric Surfactant

Suitable amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, or from about 8 to about 18 carbon atoms, and at least one of the aliphatic substituents contains an anionic water-solubilizing group, e.g. carboxy, sulfonate, sulfate. Suitable amphoteric surfactants also include sarcosinates, glycinates, taurinates, and mixtures thereof.

Enzymes

Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a detergent composition, the aforementioned additional enzymes may be present at levels from about 0.00001% to about 2%, from about 0.0001% to about 1% or even from about 0.001% to about 0.5% enzyme protein by weight of the composition. The compositions disclosed herein may comprise from about 0.001% to about 1% by weight of an enzyme (as an adjunct), which may be selected from the group consisting of lipase, amylase, protease, mannanase, cellulase, pectinase, and mixtures thereof.

Builders

Suitable builders include aluminosilicates (e.g., zeolite builders, such as zeolite A, zeolite P, and zeolite MAP), silicates, phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Alternatively, the composition may be substantially free of builder.

Polymeric Dispersing Agents

Suitable polymeric dispersing agents include carboxymethylcellulose, poly(vinylpyrrolidone), poly (ethylene glycol), an ethylene oxide-propylene oxide-ethylene oxide ($EOx_1POyEOx_2$) triblock copolymer, where each of $x_1$ and $x_2$ is in the range of about 2 to about 140 and y is in the range of from about 15 to about 70, poly(vinyl alcohol), poly (vinylpyridine-N-oxide), poly(vinylimidazole), polycarboxylates such as polyacrylates, maleic/acrylic acid copolymers and lauryl methacrylate/acrylic acid co-polymers.

Suitable polymeric dispersing agents include amphiphilic cleaning polymers such as the compound having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_5O$)n), wherein n=from 20 to 30, and x=from 3 to 8, or sulphated or sulphonated variants thereof.

Suitable polymeric dispersing agents include amphiphilic alkoxylated grease cleaning polymers which have balanced hydrophilic and hydrophobic properties such that they remove grease particles from fabrics and surfaces. The amphiphilic alkoxylated grease cleaning polymers may comprise a core structure and a plurality of alkoxylate groups attached to that core structure. These may comprise alkoxylated polyalkylenimines, for example, having an inner polyethylene oxide block and an outer polypropylene oxide block. Such compounds may include, but are not limited to, ethoxylated polyethyleneimine, ethoxylated hexamethylene diamine, and sulfated versions thereof. Polypropoxylated derivatives may also be included. A wide variety of amines and polyalklyeneimines can be alkoxylated to various degrees. A useful example is 600 g/mol polyethyleneimine core ethoxylated to 20 EO groups per NH and is available from BASF. The detergent compositions described herein may comprise from about 0.1% to about 10%, and in some examples, from about 0.1% to about 8%, and in other examples, from about 0.1% to about 6%, by weight of the detergent composition, of alkoxylated polyamines.

Suitable polymeric dispersing agents include carboxylate polymer. Suitable carboxylate polymers, which may optionally be sulfonated, include a maleate/acrylate random copolymer or a poly(meth)acrylate homopolymer. In one aspect, the carboxylate polymer is a poly(meth)acrylate homopolymer having a molecular weight from 4,000 Da to 9,000 Da, or from 6,000 Da to 9,000 Da.

Suitable polymeric dispersing agents include alkoxylated polycarboxylates, which may also be used to provide grease removal. Chemically, these materials comprise poly(meth)acrylates having one ethoxy side-chain per every 7-8 (meth) acrylate units. The side-chains are of the formula —(CH$_2$CH$_2$O)$_m$ (CH$_2$)$_n$CH$_3$ wherein m is 2-3 and n is 6-12. The side-chains are ester-linked to the polyacrylate "backbone" to provide a "comb" polymer type structure. The molecular weight can vary, but may be in the range of about 2000 to about 50,000. The detergent compositions described herein may comprise from about 0.1% to about 10%, and in some examples, from about 0.25% to about 5%, and in other examples, from about 0.3% to about 2%, by weight of the detergent composition, of alkoxylated polycarboxylates.

Suitable polymeric dispersing agents include amphiphilic graft co-polymers. A suitable amphiphilic graft co-polymer comprises (i) a polyethyelene glycol backbone; and (ii) and at least one pendant moiety selected from polyvinyl acetate, polyvinyl alcohol and mixtures thereof. A suitable amphilic graft co-polymer is Sokalan® HP22, supplied from BASF. Suitable polymers include random graft copolymers, for example, a polyvinyl acetate grafted polyethylene oxide copolymer having a polyethylene oxide backbone and multiple polyvinyl acetate side chains. The molecular weight of the polyethylene oxide backbone is typically about 6000 and the weight ratio of the polyethylene oxide to polyvinyl acetate is about 40 to 60 and no more than 1 grafting point per 50 ethylene oxide units.

Soil Release Polymer

Suitable soil release polymers have a structure as defined by one of the following structures (I), (II) or (III):

—[(OCHR—CHR$^2$)$_a$—O—OC—Ar—CO-]$_d$ (I)

—[(OCHR$^3$—CHR$^4$)$_b$—O—OC-sAr-CO-]$_e$ (II)

—[(OCHR$^5$—CHR$^6$))$_c$—OR$^7$]$_f$ (III)

wherein:
a, b and c are from 1 to 200;
d, e and f are from 1 to 50;
Ar is a 1,4-substituted phenylene;
sAr is 1,3-substituted phenylene substituted in position 5 with SO$_3$Me;
Me is Li, K, Mg/2, Ca/2, Al/3, ammonium, mono-, di-, tri-, or tetraalkylammonium wherein the alkyl groups are C$_1$-C$_{18}$ alkyl or C$_2$-C$_{10}$ hydroxyalkyl, or mixtures thereof;
R$^1$, R$^2$, R$^3$, R$^4$, R$^5$ and R$^6$ are independently selected from H or C$_1$-C$_{18}$ n- or iso-alkyl; and
R$^7$ is a linear or branched C$_1$-C$_{18}$ alkyl, or a linear or branched C$_2$-C$_{30}$ alkenyl, or a cycloalkyl group with 5 to 9 carbon atoms, or a C$_8$-C$_{30}$ aryl group, or a C$_6$-C$_{30}$ arylalkyl group.

Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN300 and SRN325 supplied by Clariant. Other suitable soil release polymers are Marloquest polymers, such as Marloquest SL supplied by Sasol.

Cellulosic Polymer

Suitable cellulosic polymers including those selected from alkyl cellulose, alkyl alkoxyalkyl cellulose, carboxyalkyl cellulose, alkyl carboxyalkyl cellulose. The cellulosic polymers may be selected from the group consisting of carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da.

Amines

Non-limiting examples of amines may include, but are not limited to, polyetheramines, polyamines, oligoamines, triamines, diamines, pentamines, tetraamines, or combinations thereof. Specific examples of suitable additional amines include tetraethylenepentamine, triethylenetetraamine, diethylenetriamine, or a mixture thereof.

Bleaching Agents

Suitable bleaching agents other than bleaching catalysts include photobleaches, bleach activators, hydrogen peroxide, sources of hydrogen peroxide, pre-formed peracids and mixtures thereof. In general, when a bleaching agent is used, the detergent compositions of the present invention may comprise from about 0.1% to about 50% or even from about 0.1% to about 25% bleaching agent by weight of the detergent composition.

Bleach Catalysts

Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and mixtures thereof.

Brighteners

Commercial fluorescent brighteners suitable for the present disclosure can be classified into subgroups, including but not limited to: derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

The fluorescent brightener may be selected from the group consisting of disodium 4,4'-bis {[4-anilino-6-morpholino-s-triazin-2-yl]-amino}-2,2'-stilbenedisulfonate (brightener 15, commercially available under the tradename Tinopal AMS-GX by BASF), disodium 4,4'-bis{[4-anilino-6-(N-2-bis-hydroxyethyl)-s-triazine-2-yl]-amino}-2,2'-stilbenedisulonate (commercially available under the tradename Tinopal UNPA-GX by BASF), disodium 4,4'-bis{[4-anilino-6-(N-2-hydroxyethyl-N-methylamino)-s-triazine-2-yl]-amino}-2,2'-stilbenedisulfonate (commercially available under the tradename Tinopal 5BM-GX by BASF). More preferably, the fluorescent brightener is disodium 4,4'-bis{ [4-anilino-6-morpholino-s-triazin-2-yl]-amino}-2,2'-stilbenedisulfonate.

The brighteners may be added in particulate form or as a premix with a suitable solvent, for example nonionic surfactant, propanediol.

Fabric Hueing Agents

A fabric hueing agent (sometimes referred to as shading, bluing or whitening agents) typically provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Suitable fabric hueing agents include dyes, dye-clay conjugates, and organic and inorganic pigments. Suitable dyes also include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and provide the desired shade either alone or in combination. Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Suitable polymeric dyes also include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. Suitable polymeric dyes also include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

The aforementioned fabric hueing agents can be used in combination (any mixture of fabric hueing agents can be used).

Encapsulates

An encapsulate may comprise a core, a shell having an inner and outer surface, said shell encapsulating said core. The core may comprise any laundry care adjunct, though typically the core may comprise material selected from the group consisting of perfumes; brighteners; hueing dyes; insect repellants; silicones; waxes; flavors; vitamins; fabric softening agents; skin care agents in one aspect, paraffins; enzymes; anti-bacterial agents; bleaches; sensates; and mixtures thereof; and said shell may comprise a material selected from the group consisting of polyethylenes; polyamides; polyvinylalcohols, optionally containing other co-monomers; polystyrenes; polyisoprenes; polycarbonates; polyesters; polyacrylates; aminoplasts, in one aspect said aminoplast may comprise a polyureas, polyurethane, and/or polyureaurethane, in one aspect said polyurea may comprise polyoxymethyleneurea and/or melamine formaldehyde; polyolefins; polysaccharides, in one aspect said polysaccharide may comprise alginate and/or chitosan; gelatin; shellac; epoxy resins; vinyl polymers; water insoluble inorganics; silicone; and mixtures thereof.

Preferred encapsulates comprise perfume. Preferred encapsulates comprise a shell which may comprise melamine formaldehyde and/or cross linked melamine formaldehyde. Other preferred capsules comprise a polyacrylate based shell. Preferred encapsulates comprise a core material and a shell, said shell at least partially surrounding said core material, is disclosed. At least 75%, 85% or even 90% of said encapsulates may have a fracture strength of from 0.2 MPa to 10 MPa, and a benefit agent leakage of from 0% to 20%, or even less than 10% or 5% based on total initial encapsulated benefit agent. Preferred are those in which at least 75%, 85% or even 90% of said encapsulates may have (i) a particle size of from 1 microns to 80 microns, 5 microns to 60 microns, from 10 microns to 50 microns, or even from 15 microns to 40 microns, and/or (ii) at least 75%, 85% or even 90% of said encapsulates may have a particle wall thickness of from 30 nm to 250 nm, from 80 nm to 180 nm, or even from 100 nm to 160 nm. Formaldehyde scavengers may be employed with the encapsulates, for example, in a capsule slurry and/or added to a composition before, during or after the encapsulates are added to such composition.

Suitable capsules that can be made using known processes. Alternatively, suitable capsules can be purchased from Encapsys LLC of Appleton, Wis. USA. In a preferred aspect the composition may comprise a deposition aid, preferably in addition to encapsulates. Preferred deposition aids are selected from the group consisting of cationic and nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or more monomers selected from the group comprising acrylic acid and acrylamide.

Dye Transfer Inhibiting Agents

Dye transfer inhibiting agents are effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents

Suitable chelating agents include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins and mixtures thereof. Chelating agents can be present in the acid or salt form including alkali metal, ammonium, and substituted ammonium salts thereof, and mixtures thereof. Other suitable chelating agents for use herein are the commercial DEQUEST series, and chelants from Monsanto, Akzo-Nobel, DuPont, Dow, the Trilon® series from BASF and Nalco.

Suds Suppressors

Compounds for reducing or suppressing the formation of suds can be incorporated into the water-soluble unit dose articles. Suds suppression can be of particular importance in the so-called "high concentration cleaning process" and in front-loading style washing machines. Examples of suds supressors include monocarboxylic fatty acid and soluble salts therein, high molecular weight hydrocarbons such as paraffin, fatty acid esters (e.g., fatty acid triglycerides), fatty acid esters of monovalent alcohols, aliphatic $C_{18}$-$C_{40}$ ketones (e.g., stearone), N-alkylated amino triazines, waxy hydrocarbons preferably having a melting point below about 100° C., silicone suds suppressors, and secondary alcohols.

Additional suitable antifoams are those derived from phenylpropylmethyl substituted polysiloxanes.

The detergent composition may comprise a suds suppressor selected from organomodified silicone polymers with aryl or alkylaryl substituents combined with silicone resin and a primary filler, which is modified silica. The detergent compositions may comprise from about 0.001% to about 4.0%, by weight of the composition, of such a suds suppressor.

The detergent composition comprises a suds suppressor selected from: a) mixtures of from about 80 to about 92% ethylmethyl, methyl(2-phenylpropyl) siloxane; from about 5 to about 14% MQ resin in octyl stearate; and from about 3 to about 7% modified silica; b) mixtures of from about 78 to about 92% ethylmethyl, methyl(2-phenylpropyl) siloxane; from about 3 to about 10% MQ resin in octyl stearate; from about 4 to about 12% modified silica; or c) mixtures thereof, where the percentages are by weight of the anti-foam.

Suds Boosters

If high sudsing is desired, suds boosters such as the $C_{10}$-$C_{16}$ alkanolamides may be used. Some examples include the $C_{10}$-$C_{14}$ monoethanol and diethanol amides. If desired, water-soluble magnesium and/or calcium salts such as $MgCl_2$, $MgSO_4$, $CaCl_2$, $CaSO_4$, and the like, may be added at levels of about 0.1% to about 2% by weight of the detergent composition, to provide additional suds and to enhance grease removal performance.

Conditioning Agents

Suitable conditioning agents include high melting point fatty compounds. The high melting point fatty compound useful herein has a melting point of 25° C. or higher, and is selected from the group consisting of fatty alcohols, fatty acids, fatty alcohol derivatives, fatty acid derivatives, and mixtures thereof. Suitable conditioning agents also include nonionic polymers and conditioning oils, such as hydrocarbon oils, polyolefins, and fatty esters.

Suitable conditioning agents include those conditioning agents characterized generally as silicones (e.g., silicone oils, polyoils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein.

Fabric Enhancement Polymers

Suitable fabric enhancement polymers are typically cationically charged and/or have a high molecular weight. The fabric enhancement polymers may be a homopolymer or be formed from two or more types of monomers. The monomer weight of the polymer will generally be between 5,000 and 10,000,000, typically at least 10,000 and preferably in the range 100,000 to 2,000,000. Preferred fabric enhancement polymers will have cationic charge densities of at least 0.2 meq/gm, preferably at least 0.25 meq/gm, more preferably at least 0.3 meq/gm, but also preferably less than 5 meq/gm, more preferably less than 3 meq/gm, and most preferably less than 2 meq/gm at the pH of intended use of the composition, which pH will generally range from pH 3 to pH 9, preferably between pH 4 and pH 8. The fabric enhancement polymers may be of natural or synthetic origin.

Pearlescent Agent

Non-limiting examples of pearlescent agents include: mica; titanium dioxide coated mica; bismuth oxychloride; fish scales; mono and diesters of alkylene glycol. The pearlescent agent may be ethyleneglycoldistearate (EGDS).

Hygiene and Malodour

Suitable hygiene and malodor active agents include zinc ricinoleate, thymol, quaternary ammonium salts such as Bardac®, polyethylenimines (such as Lupasol® from BASF) and zinc complexes thereof, silver and silver compounds, especially those designed to slowly release $Ag^+$ or nano-silver dispersions.

Buffer System

The water-soluble unit dose articles described herein may be formulated such that, during use in aqueous cleaning operations, the wash water will have a pH of between about 7.0 and about 12, and in some examples, between about 7.0 and about 11. Techniques for controlling pH at recommended usage levels include the use of buffers, alkalis, or acids, and are well known to those skilled in the art. These include, but are not limited to, the use of sodium carbonate, citric acid or sodium citrate, lactic acid or lactate, monoethanol amine or other amines, boric acid or borates, and other pH-adjusting compounds well known in the art.

The detergent compositions herein may comprise dynamic in-wash pH profiles. Such detergent compositions may use wax-covered citric acid particles in conjunction with other pH control agents such that (i) about 3 minutes after contact with water, the pH of the wash liquor is greater than 10; (ii) about 10 minutes after contact with water, the pH of the wash liquor is less than 9.5; (iii) about 20 minutes after contact with water, the pH of the wash liquor is less than 9.0; and (iv) optionally, wherein, the equilibrium pH of the wash liquor is in the range of from about 7.0 to about 8.5.

Particles

The water-soluble unit dose article disclosed herein may comprise one or more particles within or on the fibrous structure. The particles may be water-soluble. The particles may contain soluble and/or insoluble material, where the insoluble material is dispersible in aqueous wash conditions to a suspension mean particle size that is less than about 20 microns. The particles may be water-soluble, e.g., substantially free of insoluble material.

The particle may be discrete. As used herein, the term "discrete" refers to particles that are structurally distinctive from each other either under naked human eyes or under electronic imaging devices, such as scanning electron microscope (SEM) and transmission electron microscope (TEM). The particles may be discrete from each other under naked human eyes.

As used herein, the term "particle" refers to a solid matter of minute quantity. The particle may be a powder, granule, agglomerate, encapsulate, microcapsule, and/or prill. The particle may be made using a number of well known methods in the art, such as spray-drying, agglomeration, extrusion, prilling, encapsulation, pastillation and combinations thereof. The shape of the particle can be in the form of spheres, rods, plates, tubes, squares, rectangles, discs, stars, or flakes of regular or irregular shapes. The particles disclosed herein are generally non-fibrous.

Each of the particles may contain a surfactant having a relatively high hydrophilicity. Such surfactants are very effective in cleaning fabrics and removing stains and are therefore desirable to include in water-soluble unit dose articles disclosed herein. However, surfactants of higher hydrophilicity may form a viscous, gel-like hexagonal phase while being dissolved in water. It is therefore difficult to formulate such surfactants into the above-mentioned fibrous elements, because the viscous hexagonal phase may adversely affect processing of the fibrous elements and formation of the fibrous structure. By formulating such surfactants into particles that are distributed throughout the fibrous structure, such processing challenges can be readily avoided. Further, because the viscous hexagonal phase may slow down dissolution of the water-soluble unit dose articles in water during use, it is also helpful to formulate the such hydrophilic surfactants into particles that can be easily dispersed in water, which improves overall dissolution of the water-soluble unit dose articles during wash.

The particles may have a relatively low water/moisture content (e.g., no more than about 10 wt % of total water/moisture, or no more than about 8 wt % of total water/moisture, or no more than about 5 wt % of total moisture), especially a relatively low free/unbound water content (e.g., no more than about 3 wt % of free or unbound water, or no more than about 1 wt % of free or unbound water), so that water from the particles will not compromise the structural integrity of the fibrous structure. Further, a controlled moisture content in the particles reduces the risk of gelling in the particles themselves. The water/moisture content present in a particle is measured using the following Water Content Test Method.

The bulk density of the particles may range from about 500 g/L to about 1000 g/L, or from about 600 g/L to about 900 g/L, or from about 700 g/L to about 800 g/L.

Like the fibrous structures and fibrous elements described hereinabove, the particles of are also characterized by a sufficiently high surfactant content, e.g., at least about 30%, or at least about 50%, or at least about 60%, and or at least about 70%, by total weight of each particle.

Each of the particles may contain a surfactant selected from the group consisting of C6-C20 linear or branched alkylalkoxylated sulfates (AAS) having a weight average degree of alkoxylation ranging from about 0.1 to about 10, C6-C20 alkylalkoxylated alcohols (AA) having a weight average degree of alkoxylation ranging from about 5 to about 15, and combinations thereof. The surfactant may be a $C_6$-$C_{20}$ linear or branched AAS surfactant having a weight average degree of alkoxylation ranging from about 0.1 to about 10, or a $C_{10}$-$C_{16}$ linear or branched alkylethoxylated sulfate (AES) having a weight average degree of alkoxylation ranging from about 1 to about 5. Such AAS (e.g., AES) surfactant can be used either alone or in combination with other surfactants. The AAS (e.g., AES) surfactant may be used as a main surfactant in each particle, i.e., it is present at an amount that is 50% or more by total weight of all surfactants in the particle, while one or more other surfactants (anionic, nonionic, amphoteric, and/or cationic) may be present as co-surfactants for such AAS (e.g., AES). The particle may comprise from about 15 wt % to about 60 wt %, or from 20 wt % to 40 wt % alkylalkoxylated sulfate, or from 30 wt % to 80 wt % or even from 50 wt % to 70 wt % alkylalkoxylated sulfate.

The surfactant in the particles may be a nonionic surfactant. Suitable nonionic surfactants include alkylalkoxylated alcohols, such as alkylethoxylated alcohols and alkylethoxylated phenols of the formula $R(OC_2H_4)_nOH$, where R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. The nonionic surfactant may be selected from ethoxylated alcohols having an average of about 12-14 carbon atoms in the alcohol and an average degree of ethoxylation of about 9 moles of ethylene oxide per mole of alcohol. Other non-limiting examples of nonionic surfactants useful herein include: $C_8$-$C_{18}$ alkylethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkylalkoxylates, $BAE_x$, wherein x is from 1 to 30; alkylpolysaccharides, and specifically alkylpolyglycosides; polyhydroxy fatty acid amides; and ether capped poly(oxyalkylated) alcohol surfactants. Suitable nonionic surfactants also include those sold under the tradename Lutensol® from BASF.

The nonionic surfactant may be $C_6$-$C_{20}$ alkylalkoxylated alcohols (AA) having a weight average degree of alkoxylation ranging from 5 to 15, which may be present in the particles either alone or in combination with the AAS or AES surfactant described hereinabove. AA can either be present as a main surfactant or as a co-surfactant for AAS or AES in the particles. An AAS (e.g., AES) surfactant may be present as a main surfactant in the particles, while an AA surfactant is present as a co-surfactant for such AAS or AES surfactant, for example, in a weight ratio ranging from about 1:15 to about 1:2, or from about 1:10 to about 1:3, and or from about 1:8 to about 1:4.

The hydrophilic surfactant may be present in each of the particles in an amount ranging from about 20% to about 90%, or from about 30% to about 90%, or from about 40% to about 90%, or from about 50% to about 90%, by total weight of each particle.

In addition, the particles described herein may comprise one or more additional surfactants selected from the group consisting of other anionic surfactants (i.e., other than AAS and AES), amphoteric surfactants, cationic surfactants, and combinations thereof, as described hereinabove for the fibrous structure. Such additional surfactant(s) may be present in each of the particles in an amount ranging from about 0% to about 50%, or from about 1% to about 40%, or from about 2% to about 30%, or from about 5% to about 20%, by total weight of each particle. For example, such additional surfactant(s) may be an anionic surfactant selected from the group consisting of $C_6$-$C_{20}$ linear or branched LAS, $C_6$-$C_{20}$ linear or branched AS, $C_6$-$C_{20}$ linear or branched alkyl sulfonates, $C_6$-$C_{20}$ linear or branched alkyl carboxylates, $C_6$-$C_{20}$ linear or branched alkyl phosphates, $C_6$-$C_{20}$ linear or branched alkyl phosphonates, $C_6$-$C_{20}$ alkyl N-methyl glucose amides, $C_6$-$C_{20}$ methyl ester sulfonates (MES), and combinations thereof. The particle may comprise alkylbenzene sulfonate, for example, linear alkylbenzene sulfonate (LAS). The particle may comprise from 1 wt % to 50 wt % alkylbenzene sulfonate, or from 5 wt % to 30 wt % alkylbenzene sulfonate.

The above-mentioned surfactant(s) may form a surfactant system, which can be present in an amount ranging from about 5% to about 90%, or from about 10% to about 90%, or from about 20% to about 90%, or from about 30% to about 90%, and or from about 50% to about 90%, by total weight of the particles.

The particles described herein may comprise one or more additional active agents (in addition to surfactant as described hereinabove).

Each of the particles may further comprise from about 0.5% to about 20%, or from about 1% to about 15%, or from about 2% to about 10% by total weight of such particle of a rheology modifier. As used herein, the term "rheology modifier" means a material that interacts with concentrated surfactants, preferably concentrated surfactants having a mesomorphic phase structure, in a way that substantially reduces the viscosity and elasticity of said concentrated surfactant. Suitable rheology modifiers include, but are not limited to, sorbitol ethoxylate, glycerol ethoxylate, sorbitan esters, tallow alkyl ethoxylated alcohol, ethylene oxide-propylene oxide-ethylene oxide ($EOx_1POyEOx_2$) triblock copolymers wherein each of $x_1$ and $x_2$ is in the range of about 2 to about 140 and y is in the range of from about 15 to about 70, polyethyleneimine (PEI), alkoxylated variants of PEI, and preferably ethoxylated PEI, N,N,N',N'-tetraethoxylethylenediamine, and mixtures thereof.

The rheology modifier is preferably a "functional rheology modifier," which means the rheology modifier has additional detergent functionality. In some cases, a dispersant polymer, described herein below, may also function as a functional rheology modifier. The rheology modifier is preferably selected from the group consisting of an alkoxylated polyalkyleneimine, an ethylene oxide-propylene oxide-ethylene oxide ($EOx_1POyEOx_2$) triblock copolymer wherein each of $x_1$ and $x_2$ is in the range of about 2 to about 140 and y is in the range of from about 15 to about 70, an N,N,N',N'-tetraethoxylethylenediamine, and mixtures thereof.

The rheology modifier may comprise one of the polymers described above, for example, ethoxylated PEI, in combination with a polyalkylene glycol. When the second surfactant is AAS or AES, each of the particles may further comprise from about 0.5% to about 20%, or from about 1% to about 15%, or from about 2% to about 10% of a polyalkylene glycol, by total weight of such each discrete particle. The polyalkylene glycol may be a polyethylene glycol with a weight average molecular weight ranging from 500 to 20,000 Daltons, or from about 1000 to 15,000 Daltons, and or from 2000 to 8000 Daltons.

Alkoxylated Polyalkyleneimine:

The alkoxylated polyalkyleneimine may have an empirical formula of $(PEI)_a(CH_2CH_2O)_b(CH_2CH_2CH_2O)_c$, in which PEI is a polyethyleneimine core; a is the number average molecular weight ($MW_n$) of the PEI core prior to modification, which ranges from about 100 to about 100,000 Daltons, or from about 200 to about 5000 Daltons, or from about 500 to about 1000 Daltons; b is the weight average number of ethylene oxide ($CH_2CH_2O$) units per nitrogen atom in the PEI core, which ranges from 0 to about 60, or from about 1 to about 50, or from about 5 to about 40, or from about 10 to about 30; and c is the weight average number of propylene oxide ($CH_2CH_2CH_2O$) units per nitrogen atom in the PEI core, which ranges from 0 to about 60, or from 0 to about 40, or from 0 to about 30, or from 0 to about 20.

Ethylene Oxide-Propylene Oxide-Ethylene Oxide ($EOx_1POyEOx_2$) Triblock Copolymer:

In the ethylene oxide-propylene oxide-ethylene oxide ($EOx_1POyEOx_2$) triblock copolymer, each of $x_1$ and $x_2$ is in the range of about 2 to about 140 and y is in the range of from about 15 to about 70. The ethylene oxide-propylene oxide-ethylene oxide ($EOx_1POyEOx_2$) triblock copolymer preferably has an average propylene oxide chain length of between 20 and 70, preferably between 30 and 60, more preferably between 45 and 55 propylene oxide units.

Preferably, the ethylene oxide-propylene oxide-ethylene oxide ($EOx_1POyEOx_2$) triblock copolymer has a molecular weight of between about 1000 and about 10,000 Daltons, preferably between about 1500 and about 8000 Daltons, more preferably between about 2000 and about 7000 Daltons, even more preferably between about 2500 and about 5000 Daltons, most preferably between about 3500 and about 3800 Daltons.

Preferably, each ethylene oxide block or chain independently has an average chain length of between 2 and 90, preferably 3 and 50, more preferably between 4 and 20 ethylene oxide units. Preferably, the copolymer comprises between 10% and 90%, preferably between 15% and 50%, most preferably between 15% and 25% by weight of the copolymer of the combined ethylene-oxide blocks. Most preferably the total ethylene oxide content is equally split over the two ethylene oxide blocks. Equally split herein means each ethylene oxide block comprising on average between 40% and 60% preferably between 45% and 55%, even more preferably between 48% and 52%, most preferably 50% of the total number of ethylene oxide units, the % of both ethylene oxide blocks adding up to 100%. Some ethylene oxide-propylene oxide-ethylene oxide ($EOx_1POyEOx_2$) triblock copolymer, where each of $x_1$ and $x_2$ is in the range of about 2 to about 140 and y is in the range of from about 15 to about 70, improve cleaning.

Preferably the copolymer has a molecular weight between about 3500 and about 3800 Daltons, a propylene oxide content between 45 and 55 propylene oxide units, and an ethylene oxide content of between 4 and 20 ethylene oxide units per ethylene oxide block.

Preferably, the ethylene oxide-propylene oxide-ethylene oxide ($EOx_1POyEOx_2$) triblock copolymer has a molecular weight of between 1000 and 10,000 Daltons, preferably between 1500 and 8000 Daltons, more preferably between 2000 and 7500 Daltons. Preferably, the copolymer comprises between 10% and 95%, preferably between 12% and 90%, most preferably between 15% and 85% by weight of the copolymer of the combined ethylene-oxide blocks. Some ethylene oxide-propylene oxide-ethylene oxide ($EOx_1POyEOx_2$) triblock copolymer, where each of $x_1$ and $x_2$ is in the range of about 2 to about 140 and y is in the range of from about 15 to about 70, improve dissolution.

Suitable ethylene oxide—propylene oxide—ethylene oxide triblock copolymers are commercially available under the Pluronic PE series from the BASF company, or under the Tergitol L series from the Dow Chemical Company. A particularly suitable material is Pluronic PE 9200.

N,N,N',N'-tetra(2-hydroxyethyl)ethylenediamine

N,N,N',N'-tetra(2-hydroxyethyl)ethylenediamine is a suitable functional rheology modifier, which also has chelant activity.

The size distribution of the particles, as characterized according to the Granular Size Distribution Test Method, may have a D50 greater than about 150 μm and less than about 1600 μm, or a D50 greater than 205 μm and less than about 1000 μm, or a D50 greater than about 300 μm and a D90 less than about 850 μm, or a D50 greater than about 350 μm and less than about 700 μm.

The size distribution of the particle, as characterized according to the Granular Size Distribution Test Method, may have a D20 greater than about 150 μm and a D80 less than about 1400 μm, or a D20 greater than about 200 μm and a D80 less than about 1180 μm, or a D20 greater than about 250 μm and a D80 less than about 1000 μm.

The size distribution of the particle, as characterized according to the Granular Size Distribution Test Method, may have a D10 greater than about 150 μm and a D90 less than about 1400 μm, or a D10 greater than about 200 μm and a D90 less than about 1180 μm, or a D10 greater than about 250 μm and a D90 less than about 1000 μm.

The particles disclosed herein may optionally include one or more other active agents (e.g., adjunct detergent ingredient) for assisting or enhancing cleaning performance or to modify the aesthetics thereof. Illustrative examples of such adjunct detergent ingredients include: (1) inorganic and/or organic builders, such as carbonates (including bicarbonates and sesquicarbonates), sulphates, phosphates (exemplified by the tripolyphosphates, pyrophosphates, and glassy polymeric meta-phosphates), phosphonates, phytic acid, silicates, zeolite, citrates, polycarboxylates and salts thereof (such as mellitic acid, succinic acid, oxydisuccinic acid, polymaleic acid, benzene 1,3,5-tricarboxylic acid, carboxymethyloxysuccinic acid, and soluble salts thereof), ether hydroxypolycarboxylates, copolymers of maleic anhydride with ethylene or vinyl methyl ether, 1,3,5-trihydroxy benzene-2,4,6-trisulphonic acid, 3,3-dicarboxy-4-oxa-1,6-hexanedioates, polyacetic acids (such as ethylenediamine tetraacetic acid and nitrilotriacetic acid) and salts thereof, fatty acids (such as $C_{12}$-$C_{18}$ monocarboxylic acids); (2) chelating agents, such as iron and/or manganese-chelating agents selected from the group consisting of amino carboxylates, amino phosphonates, polyfunctionally-substituted aromatic chelating agents and mixtures therein; (3) clay soil removal/anti-redeposition agents, such as water-soluble ethoxylated amines (particularly ethoxylated tetraethylenepentamine); (4) polymeric dispersing agents, such as polymeric polycarboxylates, acrylic/maleic-based copolymers and water-soluble salts thereof of, hydroxypropylacrylate, maleic/acrylic/vinyl alcohol terpolymers, polyaspartates and polyglutamates; (5) optical brighteners, which include but are not limited to derivatives of stilbene, pyrazoline, coumarin, carboxylic acid, methinecyanines, dibenzothiphene-5,5-dioxide, azoles, 5- and 6-membered-ring heterocycles, and the like; (6) suds suppressors, such as monocarboxylic fatty acids and soluble salts thereof, high molecular weight hydrocarbons (e.g., paraffins, haloparaffins, fatty acid esters, fatty acid esters of monovalent alcohols, aliphatic Cis-$C_{40}$ ketones, etc.), N-alkylated amino triazines, propylene oxide, monostearyl phosphates, silicones or derivatives thereof, secondary alcohols (e.g., 2-alkyl alkanols) and mixtures of such alcohols with silicone oils; (7) suds boosters, such as $C_{10}$-$C_{16}$ alkanolamides, $C_{10}$-$C_{14}$ monoethanol and diethanol amides, high sudsing surfactants (e.g., amine oxides, betaines and sultaines), and soluble magnesium salts (e.g., $MgCl_2$, $MgSO_4$, and the like); (8) fabric softeners, such as smectite clays, amine softeners and cationic softeners; (9) dye transfer inhibiting agents, such as polyvinyl pyrrolidone polymers, polyamine N-oxide polymers, copolymers of N-vinylpyrrolidone and N-vinylimidazole, manganese phthalocyanine, peroxidases, and mixtures thereof; (10) enzymes, such as proteases, amylases, lipases, cellulases, and peroxidases, and mixtures thereof; (11) enzyme stabilizers, which include water-soluble sources of calcium and/or magnesium ions, boric acid or borates (such as boric oxide, borax and other alkali metal borates); (12) bleaching agents, such as percarbonates (e.g., sodium carbonate peroxyhydrate, sodium pyrophosphate peroxyhydrate, urea peroxyhydrate, and sodium peroxide), persulfates, perborates, magnesium monoperoxyphthalate hexahydrate, the magnesium salt of metachloro perbenzoic acid, 4-nonylamino-4-oxoperoxybutyric acid and diperoxydodecanedioic acid, 6-nonylamino-6-oxoperoxycaproic acid, and photoactivated bleaching agents (e.g., sulfonated zinc and/or aluminum phthalocyanines); (13) bleach activators, such as nonanoyloxybenzene sulfonate (NOBS), tetraacetyl ethylene diamine (TAED), amido-derived bleach activators including (6-octanamidocaproyl)oxybenzenesulfonate, (6-nonanamidocaproyl)oxybenzenesulfonate, (6-decanamidocaproyl) oxybenzenesulfonate, and mixtures thereof, benzoxazin-type activators, acyl lactam activators (especially acyl caprolactams and acyl valerolactams); and (14) any other known detergent adjunct ingredients, including but not limited to carriers, hydrotropes, processing aids, dyes or pigments (especially hueing dyes), perfumes (including both neat perfumes and perfume microcapsules), and solid fillers.

Other Particles

In addition to the surfactant-containing particles described hereinabove, the water-soluble unit dose articles described herein may further contain other particles distributed throughout the fibrous structure. For example, such other particles may include soluble and/or insoluble material, where the insoluble material is dispersible in aqueous wash conditions to a suspension mean particle size that is less than about 20 microns.

The other particles may be a powder, granule, agglomerate, encapsulate, microcapsule, and/or prill. The other particles may be made using a number of well-known methods in the art, such as spray-drying, agglomeration, extrusion, prilling, encapsulation, pastillation and combinations thereof. The shape of the other particles can be in the form of spheres, rods, plates, tubes, squares, rectangles, discs, stars, fibers or have regular or irregular random forms.

The other particles may have a D50 particle size of from about 150 μm to about 1600 μm as measured according to the Granular Size Distribution Test Method.

The other particles may be any solid, free-flowing particles, and may include a mixture of chemically different particles, such as: surfactant particles (those substantially free of the second surfactant), including surfactant agglomerates, surfactant extrudates, surfactant needles, surfactant noodles, surfactant flakes; phosphate particles; zeolite particles; silicate salt particles, especially sodium silicate particles; carbonate salt particles, especially sodium carbonate particles; polymer particles such as carboxylate polymer particles, cellulosic polymer particles, starch particles, polyester particles, polyamine particles, terephthalate polymer particles, polyethylene glycol particles; aesthetic particles such as colored noodles, needles, lamellae particles and ring particles; enzyme particles such as protease granulates, amylase granulates, lipase granulates, cellulase granulates, mannanase granulates, pectate lyase granulates, xyloglucanase granulates, bleaching enzyme granulates and co-granulates of any of these enzymes, these enzyme granulates may comprise sodium sulphate; bleach particles, such as percarbonate particles, especially coated percarbonate particles, such as percarbonate coated with carbonate salt, sulphate salt, silicate salt, borosilicate salt, or any combination thereof, perborate particles, bleach activator particles such as tetra acetyl ethylene diamine particles and/or alkyl oxybenzene sulphonate particles, bleach catalyst particles such as transition metal catalyst particles, and/or isoquinolinium bleach catalyst particles, pre-formed peracid particles, especially coated pre-formed peracid particles; filler particles such as sulphate salt particles and chloride particles; clay particles such as montmorillonite particles and particles of clay and silicone; flocculant particles such as polyethylene oxide particles; wax particles such as wax agglomerates; silicone particles, brightener particles; dye transfer inhibition particles; dye fixative particles; perfume particles such as perfume microcapsules and starch encapsulated perfume accord particles, or pro-perfume particles such as Schiff base reaction product particles; hueing dye particles; chelant particles such as chelant agglomerates; and any combination thereof.

Test Methods

Thickness Test Method

Article thickness is measured by measuring the thickness caliper of the article using—Check-Line® (by Electromatic) digital thickness guage, Model #J-40-V, where the thickness is measured at the geometric center of the article.

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in ±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 ft² or g/m² as follows:

Basis Weight=(Mass of stack)/[(Area of 1 square in stack)×(No. of squares in stack)]

For example,

Basis Weight (lbs/3000 ft²)=[[Mass of stack (g)/ 453.6 (g/lbs)]/[12.25 (in²)/144 (in²/ft²)×12]]× 3000 or,

Basis Weight (g/m²)=Mass of stack (g)/[79.032 (cm²)/10,000 (cm²/m²)×12]

Report result to the nearest 0.1 lbs/3000 ft² or 0.1 g/m². Sample dimensions can be changed or varied using a similar precision cutter as mentioned above, so as at least 100 square inches of sample area in stack.

Diameter Test Method

The diameter of a discrete fibrous element or a fibrous element within a fibrous structure is determined by using a Scanning Electron Microscope (SEM) or an Optical Microscope and an image analysis software. A magnification of 200 to 10,000 times is chosen such that the fibrous elements are suitably enlarged for measurement. When using the SEM, the samples are sputtered with gold or a palladium compound to avoid electric charging and vibrations of the fibrous element in the electron beam. A manual procedure for determining the fibrous element diameters is used from the image (on monitor screen) taken with the SEM or the optical microscope. Using a mouse and a cursor tool, the edge of a randomly selected fibrous element is sought and then measured across its width (i.e., perpendicular to fibrous element direction at that point) to the other edge of the fibrous element. A scaled and calibrated image analysis tool provides the scaling to get actual reading in µm. For fibrous elements within a fibrous structure, several fibrous elements are randomly selected across the sample of the fibrous structure using the SEM or the optical microscope. At least two portions of the fibrous structure are cut and tested in this manner. Altogether at least 100 such measurements are made and then all data are recorded for statistical analysis. The recorded data are used to calculate average (mean) of the fibrous element diameters, standard deviation of the fibrous element diameters, and median of the fibrous element diameters.

Another useful statistic is the calculation of the amount of the population of fibrous elements that is below a certain upper limit. To determine this statistic, the software is programmed to count how many results of the fibrous element diameters are below an upper limit and that count (divided by total number of data and multiplied by 100%) is reported in percent as percent below the upper limit, such as percent below 1 micrometer diameter or %-submicron, for example. We denote the measured diameter (in µm) of an individual circular fibrous element as di.

In the case that the fibrous elements have non-circular cross-sections, the measurement of the fibrous element diameter is determined as and set equal to the hydraulic diameter which is four times the cross-sectional area of the fibrous element divided by the perimeter of the cross-section of the fibrous element (outer perimeter in case of hollow fibrous elements). The number-average diameter, alternatively average diameter is calculated as:

$$d_{num} = \frac{\sum_{i=1}^{n} d_i}{n}$$

Granular Size Distribution Test Method

The granular size distribution test is conducted to determine characteristic sizes of particles. It is conducted using ASTM D 502-89, "Standard Test Method for Particle Size of Soaps and Other Detergents", approved May 26, 1989, with a further specification for sieve sizes and sieve time used in the analysis. Following section 7, "Procedure using machine-sieving method," a nest of clean dry sieves containing U.S. Standard (ASTM E 11) sieves #4 (4.75 mm), #6 (3.35 mm), #8 (2.36 mm), #12 (1.7 mm), #16 (1.18 mm), #20 (850 um), #30 (600 um), #40 (425 um), #50 (300 um), #70 (212 um), #100 (150 um) is required to cover the range of particle sizes referenced herein. The prescribed Machine-Sieving Method is used with the above sieve nest. A suitable sieve-shaking machine can be obtained from W.S. Tyler Company, Ohio, U.S.A. The sieve-shaking test sample is approximately 100 grams and is shaken for 5 minutes.

The data are plotted on a semi-log plot with the micron size opening of each sieve plotted against the logarithmic abscissa and the cumulative mass percent ($Q_3$) plotted against the linear ordinate. An example of the above data representation is given in ISO 9276-1:1998, "Representation of results of particle size analysis—Part 1: Graphical Representation", Figure A.4. A characteristic particle size (Dx), for this invention, is defined as the abscissa value at the point where the cumulative mass percent is equal to x percent, and is calculated by a straight-line interpolation between the data points directly above (a) and below (b) the x % value using the following equation:

$Dx=10\hat{\ }[Log(Da)-(Log(Da)-Log(Db))*(Qa-x\%)/(Qa-Qb)]$ where Log is the base-10 logarithm, Qa and Qb are the cumulative mass percentile values of the measured data immediately above and below the $x^{th}$ percentile, respectively; and Da and Db are the micron sieve size values corresponding to these data.

Example Data and Calculations:

| sieve size (um) | weight on sieve (g) | cumulative mass % finer (CMPF) |
|---|---|---|
| 4750 | 0 | 100% |
| 3350 | 0 | 100% |
| 2360 | 0 | 100% |
| 1700 | 0 | 100% |
| 1180 | 0.68 | 99.3% |
| 850 | 10.40 | 89.0% |
| 600 | 28.73 | 60.3% |
| 425 | 27.97 | 32.4% |
| 300 | 17.20 | 15.2% |
| 212 | 8.42 | 6.8% |
| 150 | 4.00 | 2.8% |
| Pan | 2.84 | 0.0% |

For D10 (x=10%), the micron screen size where CMPF is immediately above 10% (Da) is 300 um, the screen below (Db) is 212 um. The cumulative mass immediately above 10% (Qa) is 15.2%, below (Qb) is 6.8%.

$$D10=10^{\wedge}[\text{Log}(300)-(\text{Log}(300)-\text{Log}(212))*(15.2\%-10\%)/(15.2\%-6.8\%)]=242 \text{ um}$$

For D50 (x=50%), the micron screen size where CMPF is immediately above 50% (Da) is 1180 um, the screen below (Db) is 850 um. The cumulative mass immediately above 90% (Qa) is 99.3%, below (Qb) is 89.0%.

$$D50=10^{\wedge}[\text{Log}(600)-(\text{Log}(600)-\text{Log}(425))*(60.3\%-50\%)/(60.3\%-32.4\%)]=528 \text{ um}$$

For D90 (x=90%), the micron screen size where CMPF is immediately above 90% (Da) is 600 μm, the screen below (Db) is 425 um. The cumulative mass immediately above 50% (Qa) is 60.3%, below (Qb) is 32.4%.

$$D90=10^{\wedge}[\text{Log}(1180)-(\text{Log}(1180)-\text{Log}(850))*(99.3\%-90\%)/(99.3\%-89.0\%]=878 \text{ um}$$

Shear Viscosity Test Method

The shear viscosity of a concentrated enzyme composition of the present disclosure is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the concentrated enzyme composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta=K\gamma^{n-1}$, wherein K is the material's viscosity constant, n is the material's thinning index and γ is the shear rate. The reported apparent shear viscosity of the concentrated enzyme composition herein is calculated from an interpolation to a shear rate of 3,000 sec$^{-1}$ using the power law relation.

Onset of Melt Test Method

Onset of melt is determined using the Onset of Melt Test Method as follows. Differential Scanning Calorimetry (DSC) is used to quantify the temperature at which the onset of melt occurs for the peak melt transition of any given composition of particles to be tested. The melt temperature measurements are made using a high-quality DSC instrument with accompanying software and nitrogen purge capability, such as TA Instruments' model Discovery DSC (TA Instruments Inc./Waters Corporation, New Castle, Del., U.S.A.). A calibration check is conducted using an Indium standard sample. The DSC instrument is considered suitable to conduct the test if the onset of melt temperature measured for the Indium standard sample is within the range of 156.3-157.3° C.

A uniform test sample is prepared by obtaining at least 5 g of particles, which are then pulverised via milling into powder form using an analytical milling device, such as the IKA basic analytical mill model A11 B S1 (IKA-Werke GmbH & Co. KG, Staufen im Breisgau, Germany). The milled sample is subsequently sieved through a clean stainless steel sieve with sieve mesh size openings of nominally 1 mm in diameter (e.g. number 18 mesh size). For each sample to be tested, at least two replicate samples are independently milled and measured. A sample of the milled material weighing approximately 5 mg is placed into the bottom of a hermetic aluminium DSC sample pan, and the sample is spread out to cover the base of the pan. A hermetic aluminium lid is placed on the sample pan, and the lid is sealed with a sample encapsulating press to prevent evaporation or weight loss during the measurement process. The DSC measurements are conducted relative to a reference standard. An empty aluminum DSC sample pan used as the reference standard, in order to measure the delta in heat adsorption of the sample-containing pan versus the empty reference pan.

The DSC instrument is set up to analyze samples using the following cycle configuration selections: Sample Purge Gas is nitrogen set at 50 mL/min; Sampling Interval is set at 0.1 s/point; Equilibrate is set at −20.00° C.; Isothermal Hold is set at 1 min. Data is collected during a single heating cycle using the settings: Ramp is set at 10.00° C./min to 90.00° C.; and Isothermal Hold is set at 90.00° C. for 1 min. A sealed sample pan containing a replicate test sample is carefully loaded into the instrument, as is an empty reference pan. The DSC analysis cycle specified above is conducted and the output data is assessed. The data acquired during the DSC heating cycle is typically plotted with Temperature on the X-axis (in ° C.) and Heat Flow normalized to sample weight (in W/g) on the Y-axis, such that melting points appear as downward (endothermic) peaks since they absorb energy.

A melt transition onset temperature is the temperature at which a deflection is first observed from the baseline previously established for the melt temperature of interest. The Peak Melt temperature is the specific temperature that requires the largest observed differential energy to transition the sample from a solid phase to a melt phase, during the specified DSC heating cycle. For the purpose of this invention, the Onset of Melt temperature is defined as the melt transition onset temperature for the Peak Melt temperature. Additional general information on the DSC technique may be found in the industry standard method ASTM D3418-03—Transition Temperatures of Polymers by DSC.

Using the DSC instrument software, two points are manually defined as the "Start and Stop Integration" baseline limits. The two points selected are on flat regions of the baseline to the left and right sides, respectively, of the melt transition peak detected. This defined area is then used to determine the peak temperature (T) which can be used to report the Peak Melt Temperature. The Onset of Melt temperature for the Peak Melt temperature is then identified by the instrument software.

The Onset of Melt temperature reported is the average result (in ° C.) from the replicate samples.

Dissolution Test Method

Apparatus and Materials:

600 mL Beaker

Magnetic Stirrer 56 (Labline Model No. 1250 or equivalent)

Magnetic Stirring Rod 58 (5 cm)

Thermometer (1 to 100° C.+/−1° C.)

Cutting Die—Stainless Steel cutting die with dimensions 3.8 cm×3.2 cm

Timer (0-3,600 seconds or 1 hour), accurate to the nearest second. Timer used should have sufficient total time measurement range if sample exhibits dissolution time greater than 3,600 seconds. However, timer needs to be accurate to the nearest second.

Polaroid 35 mm Slide Mount (commercially available from Polaroid Corporation or equivalent)

35 mm Slide Mount Holder (or equivalent)

City of Cincinnati Water or equivalent having the following properties: Total Hardness=155 mg/L as $CaCO_3$; Calcium content=33.2 mg/L; Magnesium content=17.5 mg/L; Phosphate content=0.0462.

Equilibrate samples in constant temperature and humidity environment of 23° C.±1.0° C. and 50% RH±2% for at least 2 hours. Measure the basis weight of the fibrous structure sample to be measured using Basis Weight Test Method defined herein. Cut three dissolution test specimens from the article, for example fibrous structure sample using cutting die (3.8 cm×3.2 cm), so it fits within the 35 mm Slide Mount, which has an open area dimensions 24×36 mm. Lock each specimen in a separate 35 mm slide mount. Place magnetic stirring rod into the 600 mL beaker. Turn on the city water tap flow (or equivalent) and measure water temperature with thermometer and, if necessary, adjust the hot or cold water to maintain it at the testing temperature. Testing temperature is 15° C.±1° C. water. Once at testing temperature, fill beaker with 500 mL±5 mL of the 15° C.±1° C. city water. Place full beaker 54 on magnetic stirrer, turn on stirrer, and adjust stir speed until a vortex develops and the bottom of the vortex is at the 400 mL mark on the beaker. Secure the 35 mm slide mount in the alligator clamp of the 35 mm slide mount holder such that the long end of the slide mount is parallel to the water surface. The alligator clamp should be positioned in the middle of the long end of the slide mount. The depth adjuster of the holder should be set so that the distance between the bottom of the depth adjuster and the bottom of the alligator clip is ~11+/−0.125 inches. This set up will position the sample surface perpendicular to the flow of the water. In one motion, drop the secured slide and clamp into the water and start the timer. The sample is dropped so that the sample is centered in the beaker. Disintegration occurs when the nonwoven structure breaks apart. Record this as the disintegration time. When all of the visible nonwoven structure is released from the slide mount, raise the slide out of the water while continuing the monitor the solution for undissolved nonwoven structure fragments. Dissolution occurs when all nonwoven structure fragments are no longer visible. Record this as the dissolution time.

Three replicates of each sample are run and the average disintegration and dissolution times are recorded. Average disintegration and dissolution times are in units of seconds.

The average disintegration and dissolution times can be normalized for basis weight by dividing each by the sample basis weight as determined by the Basis Weight Method defined herein. Basis weight normalized disintegration and dissolution times are in units of seconds/gsm of sample $(s/(g/m^2))$.

EXAMPLES

Example 1

As illustrated in FIG. 3, a first layer of fibrous elements is spun using a first spinning beam and collected on a forming belt. The forming belt having the first layer of fibers then passes under a second spinning beam that is modified with a particle addition system. The particle addition system is capable of substantially injecting particles toward a landing zone on the forming belt that is directly under the fibrous elements from the second spinning beam. Suitable particle addition systems may be assembled from a particle feeder, such as a vibratory, belt or screw feeder, and an injection system, such as an air knife or other fluidized conveying system. In order to aid in a consistent distribution of particles in the cross direction, the particles are preferably fed across about the same width as the spinning die to ensure particles are delivered across the full width of the composite structure. Preferably, the particle feeder is completely enclosed with the exception of the exit to minimize disruption of the particle feed. The co-impingement of particles and fibrous elements on the forming belt under the second spinning beam creates a composite structure where the particle packing is dilated and fibers substantially inter-penetrate the inter-particle porosity.

Table 1 below sets forth non-limiting examples of dried fiber compositions of the present invention, which is used to make the fibrous elements. To make the fibrous elements, an aqueous solution, preferably having about 45% to 60% solids content, is processed through one or more spinning beams as shown in FIG. 3. A suitable spinning beam comprises a capillary die with attenuation airflow, along with drying airflow suitable to substantially dry the attenuated fibers before their impingement on the forming belt.

Preferably, a blend of Polyvinyl Alcohol (PVOH) and Polyethylene Oxide (PEO) is used in a blend ratio of from about 5:1 to about 10:1. The PEO portion preferably comprises a blend of molecular weights from about 100,000 to 2,000,000 g/mol.

TABLE 1

| Fiber (F) Compositions | | | |
|---|---|---|---|
| Fiber Formulation (%) | F1 | F2 | F3 |
| LAS | 47.2 | 43.1 | 51.7 |
| AS | 23.6 | 21.6 | 12.9 |
| PVOH + PEO | 26.2 | 32.3 | 32.3 |
| Moist + misc. | 3.0 | 3.0 | 3.0 |
| Total | 100 | 100 | 100 |

Table 2 below sets forth non-limiting examples of a particle compositions of the present invention. Particles may be made by a variety of suitable processes including milling, spray-drying, agglomeration, extrusion, prilling, encapsulation, pastillization and any combination thereof. One or more particles may be mixed together before adding to the composite structure.

TABLE 2

Particle (P) Compositions:

| Formulation (%) | P1 | P2 | P3 | P4 | P5 | P6 | P7 | P8 | P9 |
|---|---|---|---|---|---|---|---|---|---|
| LAS | 0.0 | 6.3 | 9.5 | 8.6 | 10.8 | 17.2 | 19.9 | 19.2 | 20.8 |
| AS | 0.0 | 0.0 | 0.0 | 0.0 | 0.0 | 0.0 | 0.0 | 0.0 | 0.0 |
| AES | 24.0 | 21.8 | 21.6 | 26.0 | 21.6 | 34.3 | 26.6 | 25.7 | 27.7 |
| Sodium Carb. | 18.0 | 15.9 | 15.3 | 14.4 | 10.0 | 21.6 | 21.3 | 20.6 | 22.2 |
| Zeolite-A | 54.2 | 33.5 | 32.0 | 46.9 | 51.8 | 0.0 | 0.0 | 0.0 | 0.0 |
| Chelant | 0.0 | 0.0 | 0.0 | 0.0 | 0.0 | 0.0 | 0.0 | 3.5 | 0.0 |
| PE20 | 0.0 | 8.6 | 3.7 | 1.0 | 3.5 | 3.5 | 3.5 | 3.4 | 3.4 |
| Disp. Poly | 0.0 | 4.1 | 0.0 | 0.0 | 0.0 | 0.0 | 8.4 | 8.1 | 8.4 |
| PEG4k | 0.8 | 0.0 | 8.2 | 0.0 | 0.0 | 0.0 | 0.0 | 0.0 | 0.0 |
| PVOH + PEO | 0.0 | 0.0 | 0.0 | 0.0 | 0.0 | 0.0 | 0.0 | 0.0 | 1.7 |
| Moist + misc. | 3.0 | 9.8 | 9.8 | 3.1 | 2.3 | 23.4 | 20.3 | 19.6 | 15.8 |
| Total | 100 | 100 | 100 | 100 | 100 | 100 | 100 | 100 | 100 |

Product chasses are exemplified in Table 3, providing structural detail for product chasses by fiber and particle components (from Tables 1 and 2, respectively), with the net chassis composition for the product. Note that other product adjunct materials such as perfume, enzymes, suds suppressor, bleaching agents, etc. may be added to a chassis.

TABLE 3

Product Chasses (C)

| Chassis | C1 | C2 | C3 | C4 | C5 | C6 | C7 | C8 | C9 | C10 | C11 | C12 | C13 | C14 |
|---|---|---|---|---|---|---|---|---|---|---|---|---|---|---|
| Fiber type | F1 | F2 | F2 | F2 | F3 | F2 | F2 | F2 | F2 | F2 | F2 | F2 | F2 | F2 |
| Fiber wt % | 28% | 28% | 28% | 27% | 27% | 27% | 19% | 16% | 27% | 23% | 23% | 23% | 23% | 19% |
| Particle type | P1 | P1 | P2 | P3 | P3 | P3 | P3 | P3 | P4 | P5 | P6 | P7 | P8 | P9 |
| Particle wt % | 72% | 72% | 72% | 73% | 73% | 73% | 81% | 84% | 73% | 77% | 77% | 77% | 77% | 81% |
| Basis wt, gsm | 2803 | 2803 | 2803 | 2879 | 2879 | 2879 | 4091 | 4848 | 2848 | 2803 | 2803 | 2803 | 2803 | 2803 |
| Formulation, g/dose: | | | | | | | | | | | | | | |
| LAS | 2.43 | 2.22 | 3.06 | 3.53 | 3.97 | 3.53 | 4.29 | 4.76 | 3.39 | 3.37 | 4.28 | 4.67 | 4.57 | 4.65 |
| AS | 1.22 | 1.11 | 1.11 | 1.11 | 0.67 | 1.11 | 1.11 | 1.11 | 1.11 | 0.92 | 0.92 | 0.92 | 0.92 | 0.78 |
| AES | 3.20 | 3.20 | 2.91 | 2.99 | 2.99 | 2.99 | 4.72 | 5.79 | 3.55 | 3.08 | 4.89 | 3.79 | 3.66 | 4.13 |
| PE20 | 0.00 | 0.00 | 1.15 | 0.51 | 0.51 | 0.51 | 0.80 | 0.98 | 0.14 | 0.50 | 0.50 | 0.50 | 0.48 | 0.51 |
| PEG4k | 0.11 | 0.11 | 0.00 | 1.14 | 1.14 | 1.14 | 1.80 | 2.21 | 0.00 | 0.00 | 0.00 | 0.00 | 0.00 | 0.00 |
| Disp poly | 0.00 | 0.00 | 0.55 | 0.00 | 0.00 | 0.00 | 0.00 | 0.00 | 0.00 | 0.00 | 0.00 | 1.20 | 1.16 | 1.25 |
| Sodium Carb. | 2.40 | 2.40 | 2.12 | 2.12 | 2.12 | 2.12 | 3.34 | 4.11 | 1.96 | 1.43 | 3.08 | 3.04 | 2.93 | 3.31 |
| Zeolite-A | 7.24 | 7.24 | 4.47 | 4.43 | 4.43 | 4.43 | 6.99 | 8.58 | 6.41 | 7.38 | 0.00 | 0.00 | 0.00 | 0.00 |
| Chelant | 0.00 | 0.00 | 0.00 | 0.00 | 0.00 | 0.00 | 0.00 | 0.00 | 0.00 | 0.00 | 0.00 | 0.00 | 0.50 | 0.00 |
| Silica | 0.00 | 0.00 | 0.91 | 0.93 | 0.93 | 0.93 | 1.47 | 1.80 | 0.00 | 0.00 | 2.88 | 2.45 | 2.37 | 1.83 |
| PVOH + PEO | 1.35 | 1.66 | 1.66 | 1.66 | 1.66 | 1.66 | 1.66 | 1.66 | 1.66 | 1.37 | 1.37 | 1.37 | 1.37 | 1.42 |
| moist & misc | 0.55 | 0.55 | 0.56 | 0.58 | 0.58 | 0.58 | 0.83 | 0.99 | 0.57 | 0.46 | 0.58 | 0.57 | 0.55 | 0.63 |
| Total chassis | 18.5 | 18.5 | 18.5 | 19.0 | 19.0 | 19.0 | 27.0 | 32.0 | 18.8 | 18.5 | 18.5 | 18.5 | 18.5 | 18.5 |

Raw Materials for Example 1

LAS is linear alkylbenzenesulfonate having an average aliphatic carbon chain length $C_{11}$-$C_{12}$ supplied by Stepan, Northfield, Ill., USA or Huntsman Corp. HLAS is acid form.

AES is $C_{12-14}$ alkyl ethoxy (3) sulfate, $C_{14-15}$ alkyl ethoxy (2.5) sulfate, $C_{12-15}$ alkyl ethoxy (1.8) sulfate, $C_{12-15}$ alkyl ethoxy (1.0) sulfate, or $C_{14-15}$ alkyl ethoxy (1.0) sulfate supplied by Stepan, Northfield, Ill., USA or Shell Chemicals, Houston, Tex., USA.

AS is a $C_{12-14}$ sulfate, supplied by Stepan, Northfield, Ill., USA, and/or a mid-branched alkyl sulfate.

Dispersant polymer (Disp poly) is molecular weight 70,000 and acrylate:maleate ratio 70:30, supplied by BASF, Ludwigshafen, Germany Ethoxylated Polyethylenimine (PE20) is a 600 g/mol molecular weight polyethylenimine core with 20 ethoxylate groups per —NH. Available from BASF (Ludwigshafen, Germany).

Chelant is diethylenetriaminepentaacetic acid (DTPA) available from Akzo-Nobel (Amsterdam, Netherlands)

Polyethylene glycol 4000 g/mol molecular weight (PEG4k) is available from Dow Chemical (Midland, Mich., USA)

Suitable grades of Polyvinyl Alcohol (PVOH) are available from Kuraray Poval (Houston Tex., USA), preferably Kuraray Poval Grade 505.

Suitable grades of Polyethlyene oxide (PEO) are available from Dow Chemical (Midland, Mich., USA), including POLYOX WSR N10 and POLYOX WSR N60K.

Table 4 below sets forth non-limiting examples of concentrated enzyme composition of the present disclosure.

TABLE 4

Concentrated Enzyme composition

| | Weight % of water-soluble unit dose article | | |
|---|---|---|---|
| Concentrated protease | 1.60 | | |
| Concentrated amylase | | 1.62 | |
| Concentrated lipase | | | 1.63 |
| Concentrated nuclease | | | 1.65 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose article comprising a water-soluble fibrous first ply superposed to a water-soluble fibrous second ply, wherein a concentrated enzyme composition is positioned between the superposed plies, where the water-soluble unit dose article comprises from about 0.1% to about 5% by weight of the article of the concentrated enzyme composition, wherein the concentrated enzyme composition consists of one or more enzymes, water and water-binding agent, and wherein the concentrated enzyme composition penetrates about 20% or less of any single ply.

2. The water-soluble unit dose article of claim 1, wherein the water-soluble unit dose article has less than about 15% by weight water.

3. The water-soluble unit dose article of claim 1, wherein the water-soluble unit dose article is substantially free of water.

4. The water-soluble unit dose article of claim 1, wherein the first ply comprises at least two layers, a first layer and a second layer, the first layer facing the second layer, wherein the second ply comprises at least two layers, a third layer and a fourth layer, the third layer facing the fourth layer, wherein said first layer is oriented towards a first ply belt side and said second layer is oriented towards a first ply air side, wherein said first ply air side is opposite said first ply belt side, wherein said third layer is oriented towards a second ply belt side and said fourth layer is oriented towards a second ply air side, wherein said second ply air side is opposite said second ply belt side, wherein said first ply belt side and said second ply belt side face away from one another, and wherein said concentrated enzyme composition is positioned between the second layer and the fourth layer.

5. The water-soluble unit dose article according to claim 4, wherein the first layer and the third layer are substantially free of the concentrated enzyme composition.

6. The water-soluble unit dose article according to claim 1, wherein the water-soluble unit dose article further comprises a plurality of particles, wherein at least one of the particles comprises an active agent selected from the group consisting of a surfactant, a structurant, a builder, a polymeric dispersing agent, an enzyme, an enzyme stabilizer, a bleach system, a brightener, a hueing agent, a chelating agent, a suds suppressor, a conditioning agent, a humectant, a perfume, a perfume microcapsule, a filler or carrier, an alkalinity system, a pH control system, a buffer, an alkanolamine, mosquito repellant, and mixtures thereof.

7. The water-soluble unit dose article according to claim 1, wherein the water-soluble unit dose article has a Basis Weight of from about 500 grams/m$^2$ to about 5,000 grams/m$^2$ as measured according to the Basis Weight Test Method.

8. The water-soluble unit dose article according to claim 1, wherein the water-soluble unit dose article has a width from about 1 cm to about 11 cm; a length from about 1 cm to about 20 cm; and a height from about 0.01 mm to about 50 mm.

9. The water-soluble unit dose article according to claim 1, wherein the water-soluble unit dose article further comprises a third ply, wherein the first ply, the second ply, and the third ply are superposed with one another so that the third ply is between the first ply and the second ply.

10. The water-soluble unit dose article according to claim 9, wherein the concentrated enzyme composition is positioned between the third ply and the first ply and/or between the third ply and the second ply.

11. The water soluble unit dose article of claim 1, wherein the water-binding agent is selected from the group consisting of glycerin, propylene glycol, glycerol, polypropylene glycol, polyethylene glycol, carboxymethylcellulose, isosorbide, and a combination thereof.

12. The water soluble unit dose article of claim 1, wherein the concentrated enzyme composition has a viscosity of from about 1 Pa-s to about 25 Pa-s when measured at 10 s$^{-1}$ at 20° C. as determined according to the Shear Viscosity Test Method.

13. A water-soluble unit dose article comprising a water-soluble fibrous first ply superposed to a water-soluble fibrous second ply, wherein a concentrated enzyme composition is positioned between the superposed plies, wherein the concentrated enzyme composition has a viscosity of from about 4 Pa-s to about 200 Pa-s when measured at 1 s$^{-1}$ at 20° C. as determined according to the Shear Viscosity Test Method and wherein the concentrated enzyme composition consists of one or more enzymes, water and water-binding agent.

14. The water-soluble unit dose article of claim 13, wherein the water-soluble unit dose article has less than about 15% by weight water.

15. The water-soluble unit dose article of claim 13, wherein the water-soluble unit dose article is substantially free of water.

16. The water-soluble unit dose article of claim 13, wherein the first ply comprises at least two layers, a first layer and a second layer, the first layer facing the second layer, wherein the second ply comprises at least two layers, a third layer and a fourth layer, the third layer facing the fourth layer, wherein said first layer is oriented towards a first ply belt side and said second layer is oriented towards a first ply air side, wherein said first ply air side is opposite said first ply belt side, wherein said third layer is oriented towards a second ply belt side and said fourth layer is oriented towards a second ply air side, wherein said second ply air side is opposite said second ply belt side, wherein said first ply belt side and said second ply belt side face away from one another, and wherein said concentrated enzyme composition is positioned between the second layer and the fourth layer.

17. The water-soluble unit dose article according to claim 13, wherein the first layer and the third layer are substantially free of the concentrated enzyme composition.

18. The water soluble unit dose article of claim 13, wherein the water-binding agent is selected from the group consisting of glycerin, propylene glycol, glycerol, polypropylene glycol, polyethylene glycol, carboxymethylcellulose, isosorbide, and a combination thereof.

19. The water soluble unit dose article of claim 13, wherein the concentrated enzyme composition penetrates about 20% or less of any single ply.

* * * * *